United States Patent
Noda

(10) Patent No.: US 9,244,526 B2
(45) Date of Patent: Jan. 26, 2016

(54) DISPLAY CONTROL APPARATUS, DISPLAY CONTROL METHOD, AND PROGRAM FOR DISPLAYING VIRTUAL OBJECTS IN 3D WITH VARYING DEPTH

(75) Inventor: Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 445 days.

(21) Appl. No.: 13/533,044

(22) Filed: Jun. 26, 2012

(65) Prior Publication Data
US 2013/0009956 A1 Jan. 10, 2013

(30) Foreign Application Priority Data
Jul. 6, 2011 (JP) ................................ 2011-150486

(51) Int. Cl.
G06F 3/01 (2006.01)
H04N 13/00 (2006.01)
H04N 13/04 (2006.01)
G06F 1/16 (2006.01)
G06F 3/0481 (2013.01)

(52) U.S. Cl.
CPC .............. *G06F 3/011* (2013.01); *G06F 1/1601* (2013.01); *G06F 3/04815* (2013.01); *H04N 13/007* (2013.01); *H04N 13/0022* (2013.01); *H04N 13/0402* (2013.01); *H04N 13/0445* (2013.01); *G06F 2200/1612* (2013.01)

(58) Field of Classification Search
CPC ......... G06F 3/011; G06F 3/017; G06T 15/08; G06T 19/006; G06T 19/20; G06T 2219/2016; G06T 2219/2012; H04N 13/0022; H04N 13/0033; H04N 13/0051; H04N 13/0059
See application file for complete search history.

(56) References Cited

U.S. PATENT DOCUMENTS

| 5,999,185 | A * | 12/1999 | Kato ..................... G06F 3/011 345/420 |
|---|---|---|---|
| 2009/0217211 | A1 * | 8/2009 | Hildreth et al. ............... 715/863 |
| 2010/0194880 | A1 | 8/2010 | Furutani et al. |
| 2012/0051596 | A1 * | 3/2012 | Darnell ............. G06K 9/00355 382/103 |
| 2012/0069159 | A1 * | 3/2012 | Matsui et al. .................... 348/51 |
| 2012/0081524 | A1 * | 4/2012 | Joseph et al. .................... 348/51 |
| 2012/0127325 | A1 * | 5/2012 | Lai ............................. 348/207.1 |
| 2012/0236133 | A1 * | 9/2012 | Gallagher ........................ 348/60 |
| 2013/0207896 | A1 * | 8/2013 | Robinson et al. ............. 345/158 |

FOREIGN PATENT DOCUMENTS

JP 2010-183378 A 8/2010

* cited by examiner

Primary Examiner — Mark Zimmerman
Assistant Examiner — Nurun N Flora
(74) Attorney, Agent, or Firm — Hazuki International, LLC

(57) ABSTRACT

Provided is a display control apparatus controlling display of a transmissive display which includes a screen configured to transmit light arriving from an object located on a side of a first surface so that the object is viewable from a viewpoint position set on a side of a second surface which is an opposite surface to the first surface and which displays a display object to be stereoscopically viewed. The display control apparatus includes an acquisition unit that acquires position information indicating a relative positional relation between the transmissive display and the object, and a display control unit that changes, in accordance with a change in the relative positional relation in the position information, a depth of the display object from the screen perceived from the viewpoint position, the display object being displayed to be stereoscopically viewed by the transmissive display.

15 Claims, 31 Drawing Sheets

FIG. 13
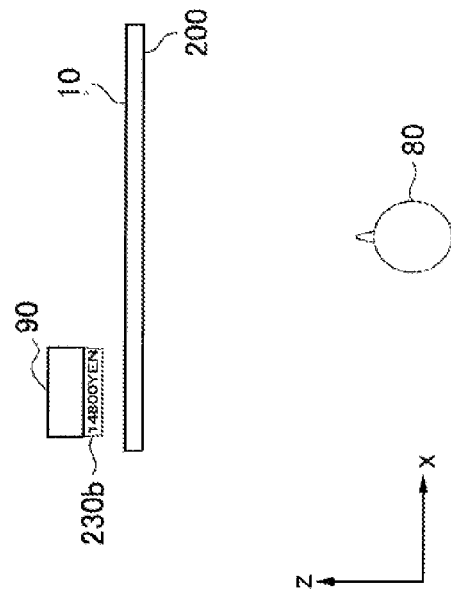
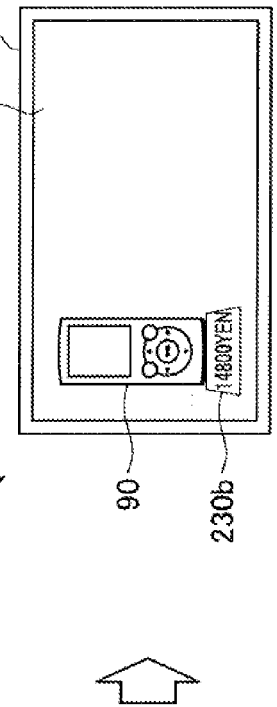
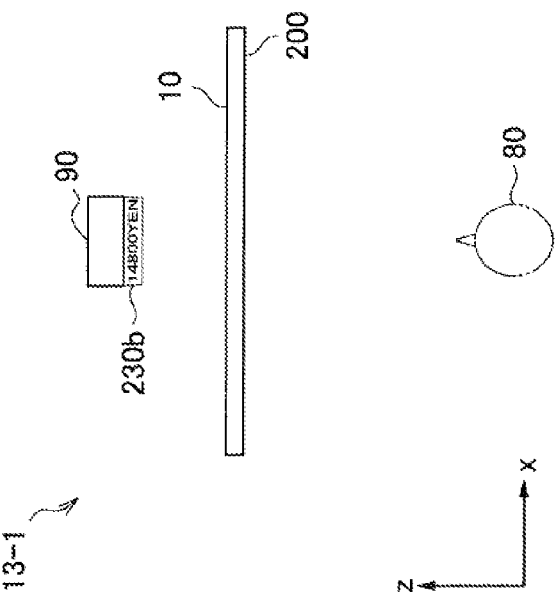
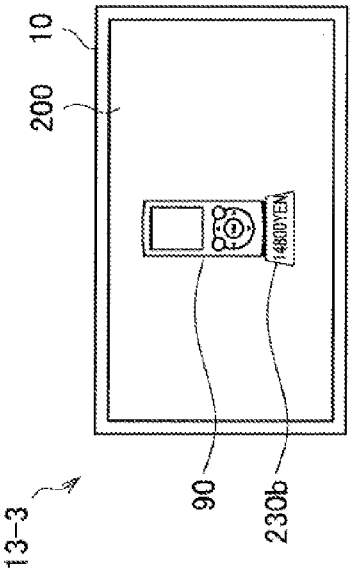

DISPLAY CONTROL APPARATUS, DISPLAY CONTROL METHOD, AND PROGRAM FOR DISPLAYING VIRTUAL OBJECTS IN 3D WITH VARYING DEPTH

CROSS-REFERENCE TO RELATED APPLICATION

The present application claims priority from Japanese Patent Application No. JP 2011-150486 filed in the Japanese Patent Office on Jul. 6, 2011, the entire content of which is incorporated herein by reference.

BACKGROUND

The present disclosure relates to a display control apparatus, a display control method, and a computer program.

In recent years, transmissive displays that include a screen transmitting light from one surface side to the other surface side have been realized and developed. The transmissive displays are realized using liquid crystal such as polymer-dispersed liquid crystal. The liquid crystal diffuses light when an application voltage is in an off-state, and transmits light when the application voltage is in an on-state.

Japanese Unexamined Patent Application Publication No. 2010-183378 discloses a technology of changing the direction of character signs displayed on the screen of a transmissive display depending on a surface of a transmissive display viewed by a user in a portable telephone including the transmissive display.

SUMMARY

In the technology disclosed in Japanese Unexamined Patent Application Publication No. 2010-183378, when a person who is the user views an object through the transmissive display, the characters or the signs on the screen of the transmissive display may burden the eyes of the user. For example, the person has to focus on the position of the object from the position of the screen or on the position of the screen from the position of the object in order to view the characters or the signs displayed on the screen of the transmissive display and the object present at a position distant from the screen. As a result, the burden on the eyes of the person may increase.

It is desirable to provide a display control apparatus, a display control method, and a computer program that are novel and improved and are capable of realizing a display of a transmissive display, while reducing a burden on the eyes of a person when the person views an object through the transmissive display.

According to an embodiment of the present disclosure, there is provided a display control apparatus controlling display of a transmissive display which includes a screen configured to transmit light arriving from an object located on a side of a first surface so that the object is viewable from a viewpoint position set on a side of a second surface which is an opposite surface to the first surface and which displays a display object to be stereoscopically viewed. The display control apparatus includes an acquisition unit that acquires position information indicating a relative positional relation between the transmissive display and the object, and a display control unit that changes, in accordance with a change in the relative positional relation in the position information, a depth of the display object from the screen perceived from the viewpoint position, the display object being displayed to be stereoscopically viewed by the transmissive display.

According to another embodiment of the present disclosure, there is provided a display control method of controlling display of a transmissive display which includes a screen configured to transmit light arriving from an object located on a side of a first surface so that the object is viewable from a viewpoint position set on a side of a second surface which is an opposite surface to the first surface and which displays a display object to be stereoscopically viewed. The display control method includes acquiring position information indicating a relative positional relation between the transmissive display and the object, and changing, in accordance with a change in the relative positional relation in the position information, a depth of the display object from the screen perceived from the viewpoint position, the display object being displayed to be stereoscopically viewed by the transmissive display.

According to still another embodiment of the disclosure, there is provided a computer program for causing a computer, which is directly or indirectly connected to a transmissive display which includes a screen configured to transmit light arriving from an object located on a side of a first surface so that the object is viewable from a viewpoint position set on a side of a second surface which is an opposite surface to the first surface and which displays a display object to be stereoscopically viewed, to execute acquiring position information indicating a relative positional relation between the transmissive display and the object, and changing, in accordance with a change in the relative positional relation in the position information, a depth of the display object from the screen perceived from the viewpoint position, the display object being displayed to be stereoscopically viewed by the transmissive display.

According to the embodiments of the present disclosure described above, the display of the transmissive display can be realized while reducing the burden on the eyes of a person when the person views an object through the transmissive display.

BRIEF DESCRIPTION OF THE DRAWINGS

FIG. 13 is a diagram illustrating an example of a change in the position of a display object;

DETAILED DESCRIPTION OF THE EMBODIMENTS

Figure 1:
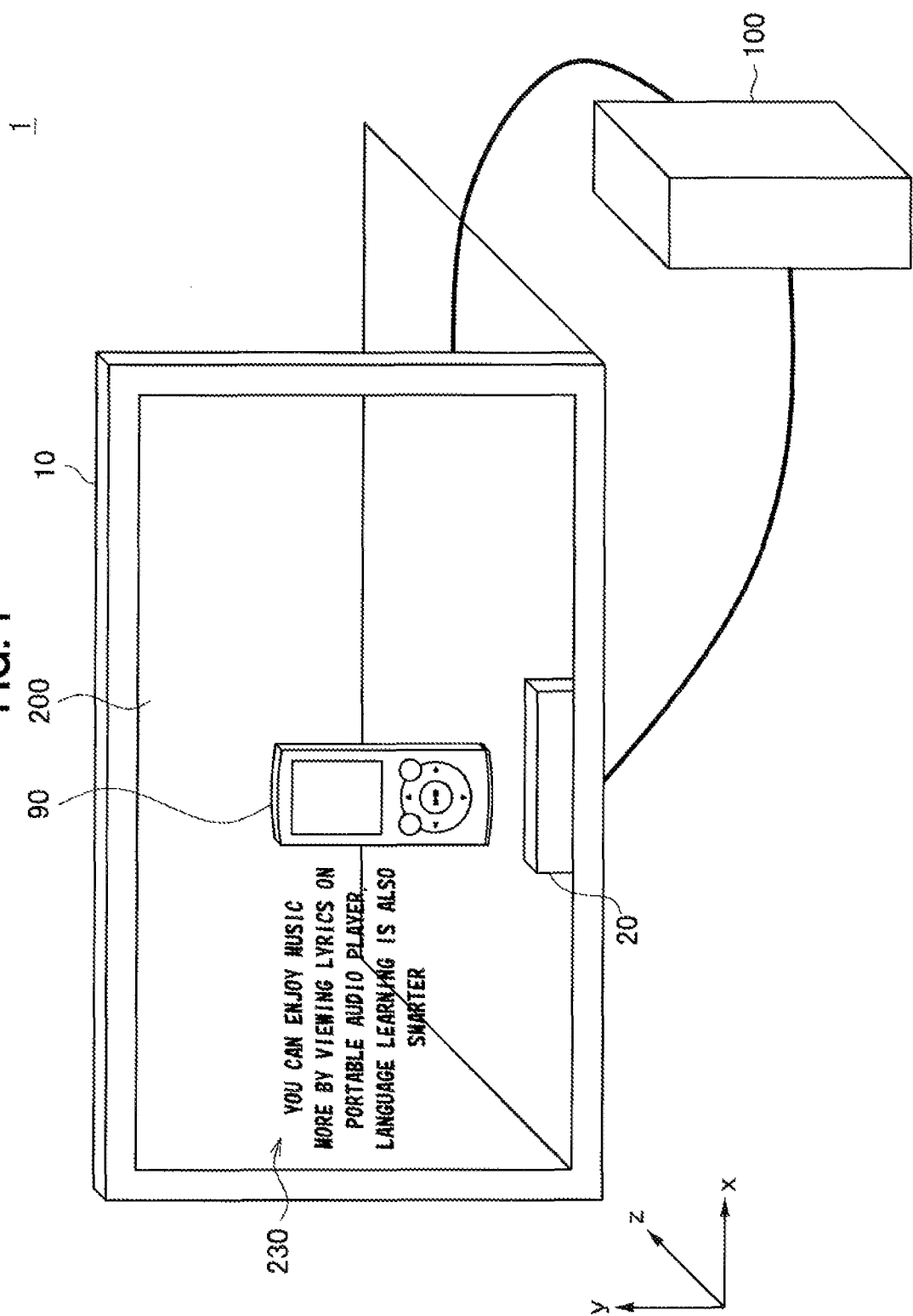
FIG. 1 is a schematic diagram illustrating an example of a display control system according to an embodiment.

Hereinafter, preferred embodiments of the prevent disclosure will be described in detail with reference to the accompanying drawings. Throughout the specification and the drawings, the same reference numerals are given to constituent elements having substantially the same functional configuration, and the description thereof will not be repeated.

The description will be made in the following order.
1. Overview of Display Control System
2. Configuration of Display Control Apparatus
    2.1. Logical Configuration of Display Control Apparatus
    2.2. Display Control Unit
    2.3. Hardware Configuration of Display Control Apparatus
3. Processing Flow
4. Modified Examples
    4.1. Logical Configuration of Display Control Apparatus
    4.2. Processing Flow
5. Summarization 1. Overview Of Display Control System First, the overall configuration of a display control system according to an embodiment of the present disclosure will be described with reference to FIG. 1. FIG. 1 is a schematic diagram illustrating an example of a display control system 1 according to this embodiment. The display control system 1 according to this embodiment includes a transmissive display 10, a camera 20, and a display control apparatus 100. In FIG. 1 and the other drawings, x, y, and z axes representing three perpendicular axes in a three-dimensional space are illustrated. More specifically, the x axis represents an axis parallel to a horizontal direction of a screen 200 of the transmissive display 10. The y axis represents an axis parallel to the vertical direction of the screen 200 of the transmissive display 10. The z axis represents an axis perpendicular to the screen 200 (xy plane) of the transmissive display 10.

Transmissive Display 10

The transmissive display 10 is a display apparatus that includes the screen 200 configured to transmit light arriving from an object 90 located on the side of a first surface so that the object 90 can be viewed from a viewpoint position set on the side of a second surface which is the opposite surface to the first surface. The transmissive display 10 can display a generated display image on the screen 200. The display image to be displayed includes a display object 230 such as a menu, a figure, text, an icon, or a window. The transmissive display 10 can be realized using, for example, polymer-scattered liquid crystals (polymer-dispersed liquid crystals or polymer network liquid crystals). The transmissive display 10 may be realized using other liquid crystals, an organic electro-luminescence display, or the like.

The transmissive display 10 is a display apparatus that displays the display object 230 on the screen 200 to be stereoscopically viewed. More specifically, the transmissive display 10 displays right-eye and left-eye images on the screen 200. The right-eye image includes a right-eye object of the display object 230. The left-eye image includes a left-eye object of the display object 230. An offset in right and left directions (that is, the x-axis direction) is present between the display positions of the right-eye and left-eye objects within the screen 200. The offset causes a deviation (that is, parallax between the eyes) of the relative position of the display object 230 to occur between the right and left retinas of a person who views the screen 200. The parallax between the eyes leads the person to perceive the depth of the display object 230 from the screen 200. Motion (that is, convergence) is caused in the right and left eyes whose lines of sight of the display object 230 displayed to be stereoscopically viewed by the offset intersect. The muscle control of the motions of the eyes also leads to the person to perceive the depth of the display object 230.

Figure 2:
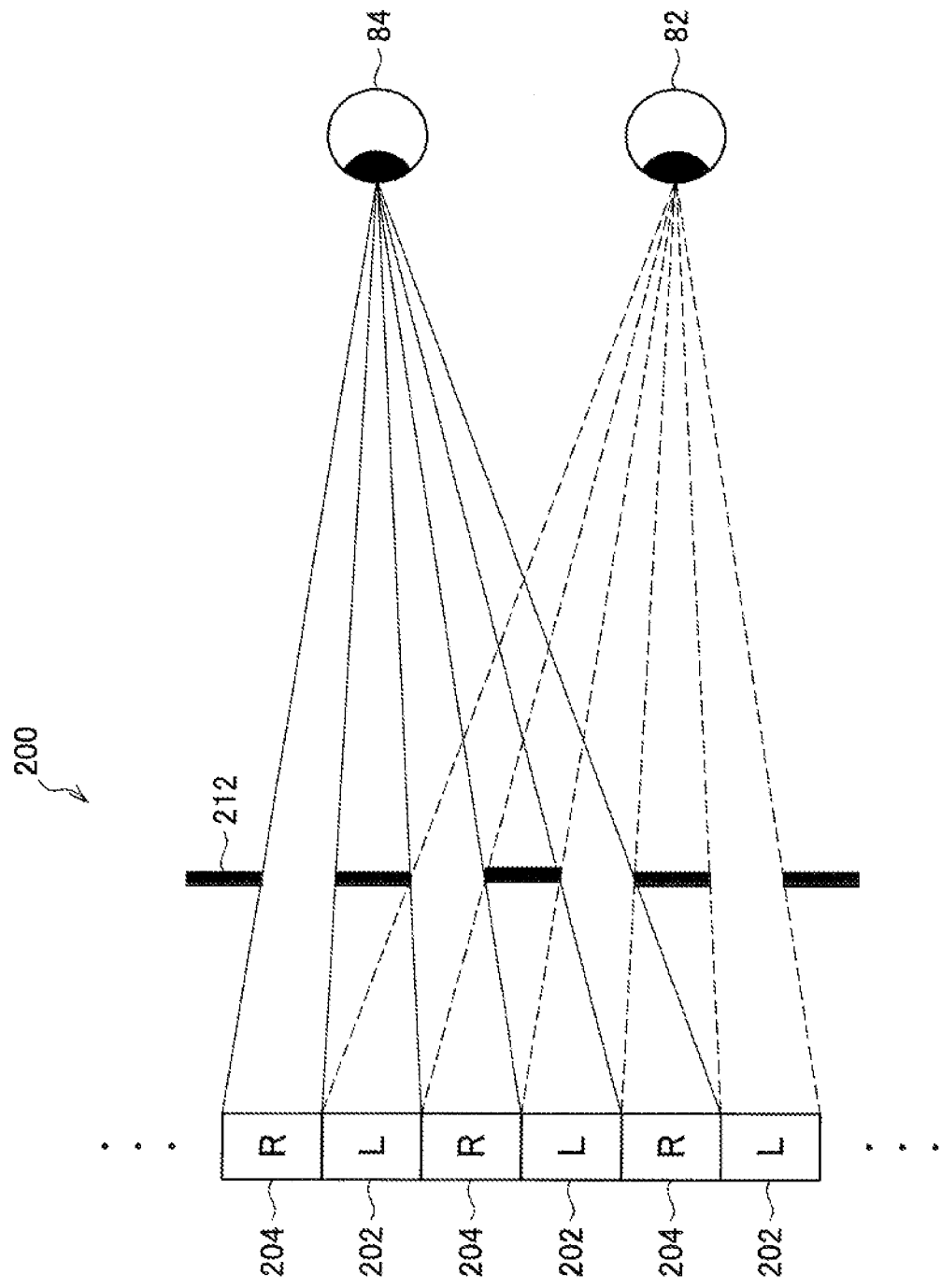
FIG. 2 is a diagram illustrating a parallax barrier method for a stereoscopic view.

A naked-eye type method such as a parallax barrier method or a lenticular method is used as a method for stereoscopic view. FIG. 2 is a diagram illustrating a parallax barrier method for a stereoscopic view. Referring to FIG. 2, the screen 200 includes left-eye display regions 202 configured to display a left-eye image and right-eye display regions 204 configured to display a right-eye image. A slit 212 is located so as to cover the screen 200. The left-eye display regions 202 and the right-eye display regions 204 are shown to a left eye 82 and a right eye 84, respectively, through openings of the slit 212. On the other hand, since the slit 212 is present, the right-eye display regions 204 and the left-eye display regions 202 are not shown to the left eye 82 and the right eye 84, respectively. Thus, a stereoscopic display is realized in the parallax barrier method.

Figure 3:
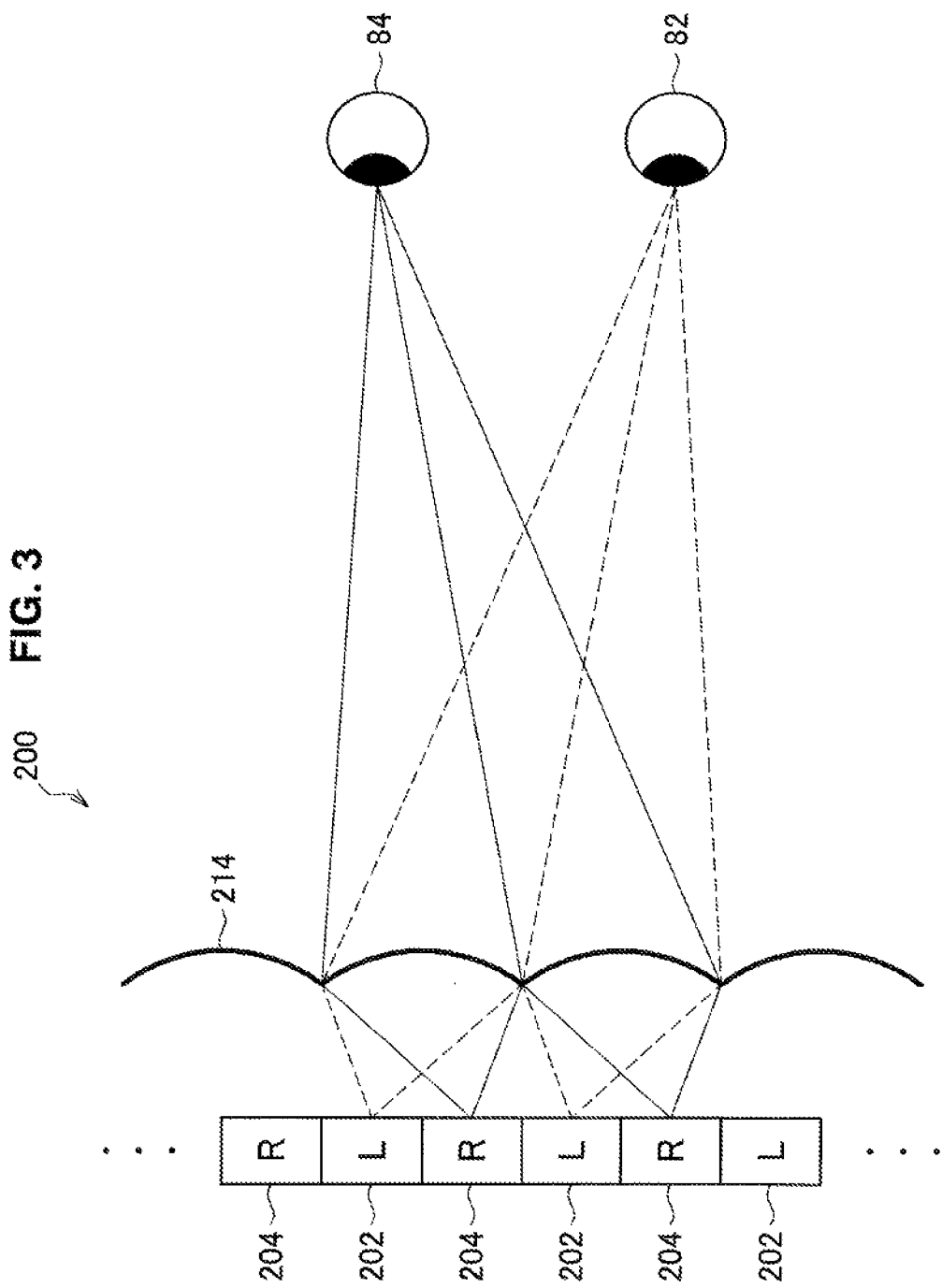
FIG. 3 is a diagram illustrating a lenticular method for a stereoscopic view.

FIG. 3 is a diagram illustrating a lenticular method for a stereoscopic view. Referring to FIG. 3, the screen 200 includes left-eye display regions 202 configured to display a left-eye image and right-eye display regions 204 configured to display a right-eye image. A lenticular lens 214 including convex lenses arranged in parallel is located to cover the screen 200. By collecting light on the individual convex lenses of the lenticular lens 214, the left-eye display regions 202 are shown to the left eye 82 but are not shown to the right eye 84, whereas the right-eye display regions 204 are shown to the right eye 84 but are not shown to the left eye 82. Thus, in the lenticular method, stereoscopic view display is realized.

The parallax barrier method and the lenticular method have a simple structure in which the screen 200 is covered by the slit 212 or the lenticular lens 214, respectively. Accordingly, the parallax barrier method and the lenticular method are applicable to the transmissive display 10. The examples of a method for a stereoscopic view include the parallax barrier method and the lenticular method. However, the method of realizing a stereoscopic view applied to this embodiment is not limited thereto. For example, another naked-eye stereoscopic method may be applied or a glasses-type method such as a polarized filter method or a liquid crystal shutter method may be applied. In this embodiment, any method of realizing stereoscopic view display in the transmissive display 10 can be applied.

Figure 4:
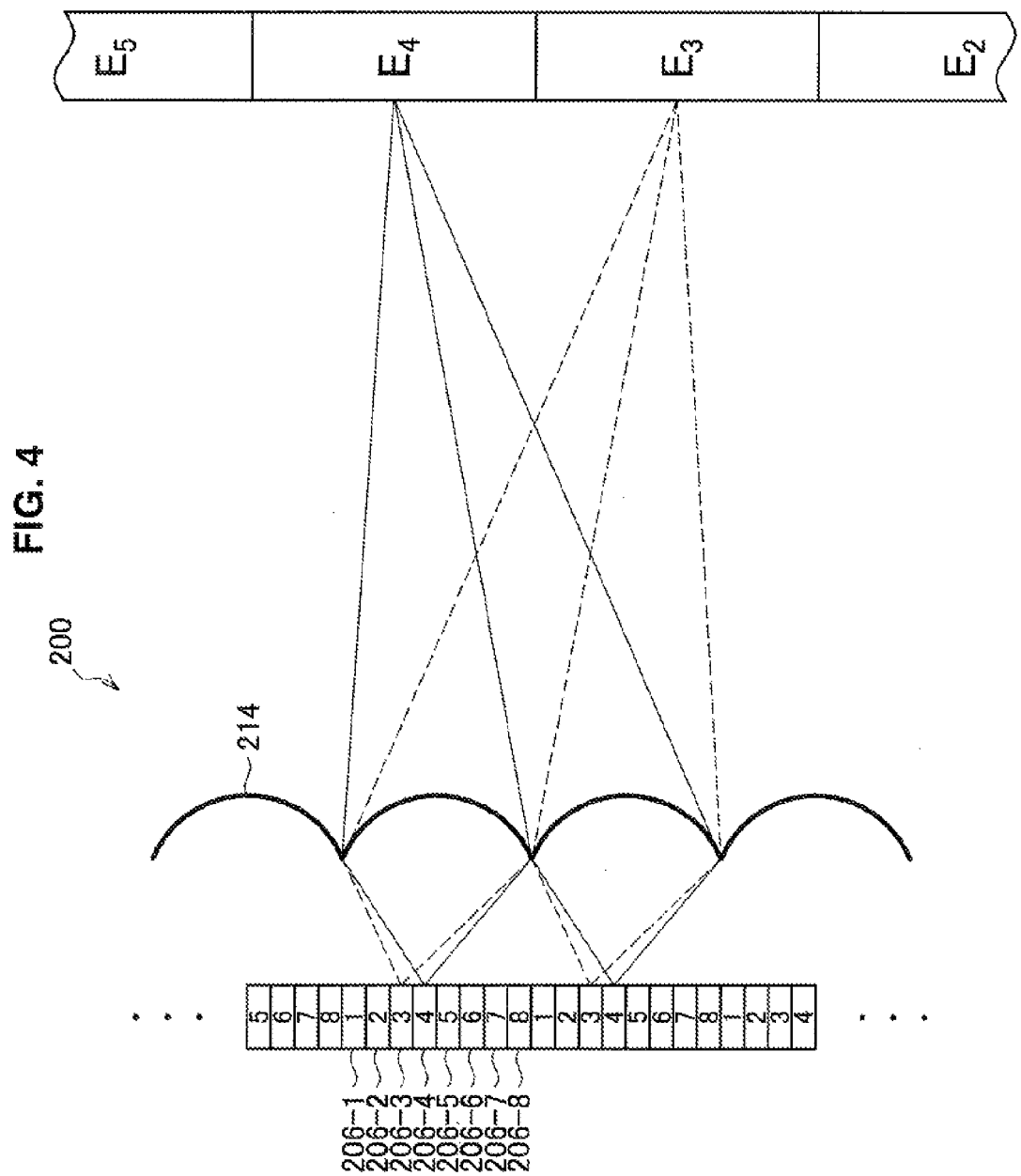
FIG. 4 is a diagram illustrating the lenticular method for a stereoscopic view at multiple viewpoints.

A plurality of viewpoint positions at which the transmissive display 10 is viewed may be set on the side (a direction A to be described later in FIG. 6) of the second surface of the transmissive display 10. Further, the transmissive display 10 may be a multiple-viewpoint stereoscopic display that is capable of displaying an individual display image corresponding to each viewpoint position to be viewed from each viewpoint position among the plurality of viewpoint positions and stereoscopically displaying the display object 230 within an individual display image. FIG. 4 is a diagram illustrating the lenticular method for a stereoscopic view at the multiple viewpoint positions. Referring to FIG. 4, the screen 200 includes display regions 206 used to supply an image to eight individual positions E at which the left eye 82 or the right eye 84 can be located. The lenticular lens 214 including convex lenses arranged in parallel is located so as to cover the screen 200. By collecting light on the individual convex lenses of the lenticular lens 214, a first individual display region 206-1 to an eighth individual display region 206-8 are shown only to individual positions $E_1$ to $E_8$ (where the positions $E_1$, $E_6$, $E_7$, and $E_8$ are not illustrated in FIG. 4). For example, when it is assumed that the left eye 82 is located at the individual position $E_3$ and the right eye 84 is located at the individual position $E_4$, an image displayed at the display region 206-3 is shown to the left eye 82 and an image displayed at the display region 206-4 is shown to the right eye 84. Accordingly, the image displayed at the display region 206-3 serves as a left-eye image and the image displayed at the display region 206-4 serves as a right-eye image. That is, a combination of two individual positions among the individual positions $E_1$ to $E_8$ becomes one viewpoint position 80 (for example, the individual positions $E_3$ and $E_4$). The images of two individual display regions (for example, the individual display regions 206-3 and 206-4) corresponding to two individual positions of the combination serve as display images (left-eye and right-eye images) corresponding to the one viewpoint position 80. Thus, the stereoscopic view display is realized in the multiple-viewpoint stereoscopic display.

Since stereoscopic view display is realized at the multiple viewpoints by the lenticular lens and the design of the display regions of the screen, the lenticular method for the multiple-viewpoint stereoscopic view is also applicable to the transmissive display 10. The lenticular method has been described as an example of the method for a stereoscopic view at the multiple viewpoints, but the method applicable to this embodiment is not limited thereto. For example, a parallax barrier method or a multi-projection method may be applied. Thus, in this embodiment, any method of realizing multiple-viewpoint stereoscopic view display in the transmissive display 10 can be applied. In FIG. 4, the case in which the number of individual positions E at which the left eye 82 or the right eye 84 can be located is eight has been described above. However, the number of individual positions E applied in this embodiment is not limited thereto. For example, the number of individual positions E may be several tens or more. In this embodiment, any number of individual positions E can be set.

Figure 5:
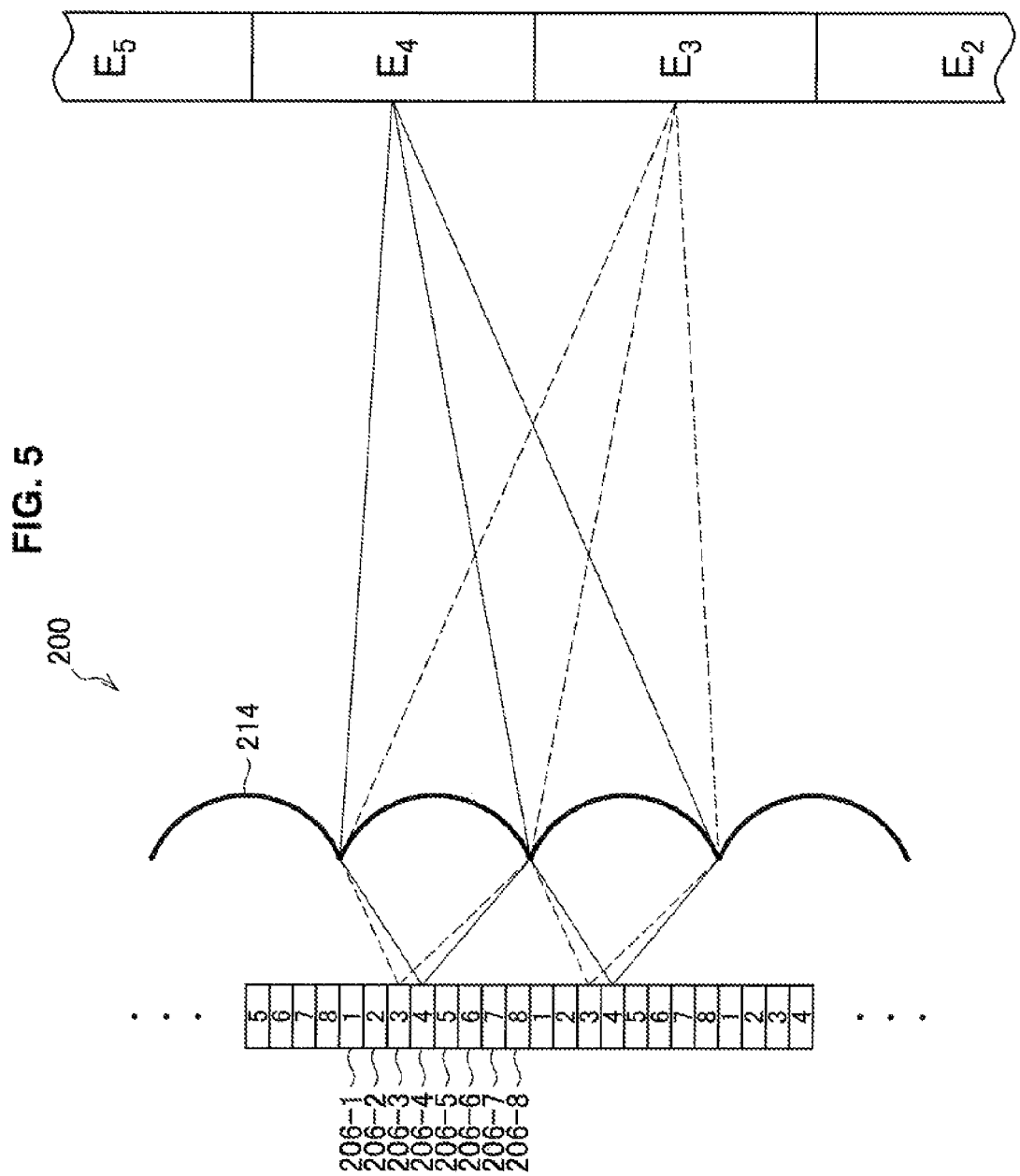
FIG. 5 is a diagram illustrating an example of a display object which can be stereoscopically displayed.

FIG. 5 is a diagram illustrating an example of a display object which can be stereoscopically displayed. Referring to FIG. 5, a left-eye object 230b and a right-eye object 230c for a left eye 82 and a right eye 84, respectively, having an offset O are displayed on the screen 200. As a result, parallax between the eyes is caused by the offset O, and thus a person with the left eye 82 and the right eye 84 perceives a depth $D_1$ (that is, $D_1$ in the z axis direction) of a display object 230a.

The transmissive display 10 may be a touch panel apparatus that includes a touch detection surface. In this case, the display position of the display object 230 displayed on the screen 200 of the transmissive display 10 may be changed in response to a touch on the screen 200. Further, a resistive film method, an electrostatic capacitance method, an optical method, an electromagnetic induction method, an ultrasonic wave method, or the like may be applied as the method of detecting a touch. However, the embodiment of the present disclosure is not limited thereto, but any method of detecting a touch can be used.

Figure 6:
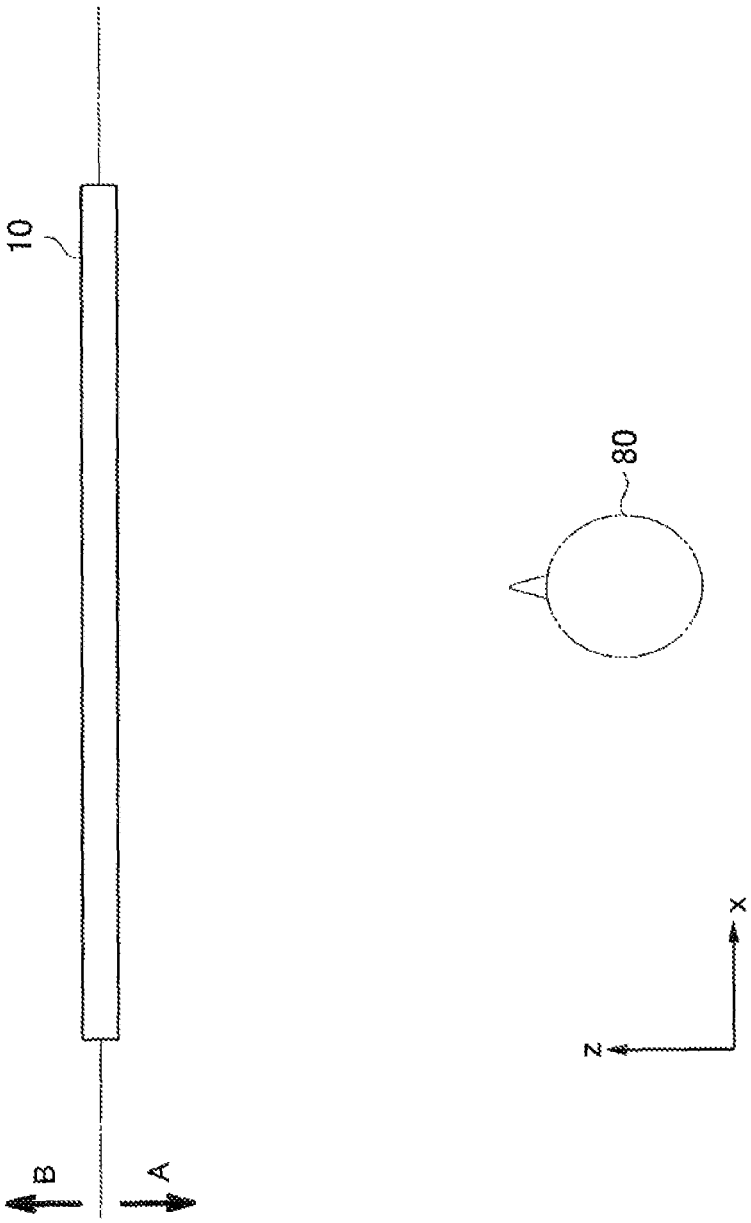
FIG. 6 is a diagram illustrating a positional relation between a transmissive display, and an object and a viewpoint position to be set.

FIG. 6 is a diagram illustrating a positional relation between the transmissive display 10, and the object and the viewpoint position 80 to be set. In this embodiment, the object 90 is located on a side of a first surface (that is, a direction B in FIG. 6) of the transmissive display 10 and the viewpoint position 80 is set on a side of a second surface (that is, a direction A in FIG. 6) of the transmissive display 10. The display of the transmissive display 10 is controlled based on a relative positional relation between the transmissive display 10 and the object 90. Here, the object 90 may be a stationary object or an independently moving object, such as another person, an animal, or a machine. Even when the object is a stationary object, the object 90 is operated by an external force (for example, the force of a person).

Camera 20

The camera 20 images the object 90 located on the side of the first surface (that is, the direction B in FIG. 6) of the transmissive display 10. As shown in FIG. 1, the camera 20 is provided, for example, at the same position of the transmissive display 10 on the xz plane (that is, the horizontal plane) shown in FIG. 1. As will be described later, the camera 20 has, for example, a horizontal image angle $2\alpha$ and a vertical image angle $2\beta$. The horizontal and vertical image angles are used to recognize the direction of the object 90. The camera 20 outputs a digital image obtained through imaging to the display control apparatus 100. Here, to measure the distance of the object 90, the camera 20 is configured by a camera such as a stereo camera or a camera capable of measuring the distance of an object, such as a time-of-flight (TOF) range image sensor. For example, the TOF range image sensor measures a distance up to an object using the delay of light measured when the light starting from a light source is reflected from the object and arrives at a sensor.

Display Control Apparatus 100

The display control apparatus 100 controls the display of the transmissive display 10. In this embodiment, the display control apparatus 100 acquires position information. indicating a relative positional relation between the transmissive display 10 and the object 90. Then, the display control apparatus 100 changes the depth of the display object 230 from the screen 200, which is perceived from the viewpoint position 80, in accordance with a change in the relative positional relation in the position information, the display object 230 being displayed to be stereoscopically viewed by the transmissive display 10. Thus, when a person located at the viewpoint position views the object through the transmissive display, it is possible to realize the display of the transmissive display capable of reducing a burden on the eyes of the person. The display control apparatus 100 will be described in detail in "2. Configuration of Display Control Apparatus."

Other Configuration

The display control system 1 may further include other elements in addition to the transmissive display 10, the camera 20, and the display control apparatus 100. For example, the display control system 1 may include not only the camera 20 but also an additional camera that images a person located on the side of the second surface (that is, the direction A in FIG. 6) of the transmissive display 10. Further, the additional camera may be a camera that can measure the distance of an object. The actual position of the person can be recognized using the additional camera instead of supposing that the person is located at the viewpoint position 80. As a result, it is possible to realize the display of the transmissive display capable of reducing a burden on the eyes of the person irrespective of the position at which the person is located.

The display control system 1 may further include a separate apparatus that supplies information to recognize the position of the object 90 or a person instead of the camera 20 or the above-described additional camera. The separate apparatus may be an infrared sensor or a pressure sensor provided on the side of the first surface (that is, the direction B in FIG. 6) or the side of the second surface (the direction A in FIG. 2) of the transmissive display 10. The separate apparatus may be a reception apparatus that receives radio waves from a transmitter that the object 90 or the person has, and then generates information used to specify the position of the object 90 or the person based on the received radio waves. The display control system 1 according to this embodiment may include any apparatus that supplies information used to specify the position or the distance of the object 90 or the person.

The display control system 1 may include an apparatus that recognizes the position of the object 90 or the person from a digital image of the camera 20 or information of another apparatus. In this case, the display control apparatus 100 may not have a function of recognizing the position of the object 90 or the person. The display control system 1 may include an apparatus that generates a display image to be displayed on the transmissive display 10 under the control of the display control apparatus 100. In this case, the display control system 100 may not have a function of generating the display image.

The display control system 1 may further include an input apparatus that operates the display object 230 displayed on the transmissive display 10. Examples of the input apparatus include a mouse, a keyboard, a touch panel, a button, a switch, a lever, a remote controller, and an external connection apparatus, such as a cellular phone or a PDA, corresponding to an operation of the transmissive display 10.

2. CONFIGURATION OF DISPLAY CONTROL APPARATUS

Next, the configuration of the display control apparatus 100 according to this embodiment will be described with reference to FIGS. 7 to 27.

2.1. Logical Configuration of Display Control Apparatus

Figure 7:
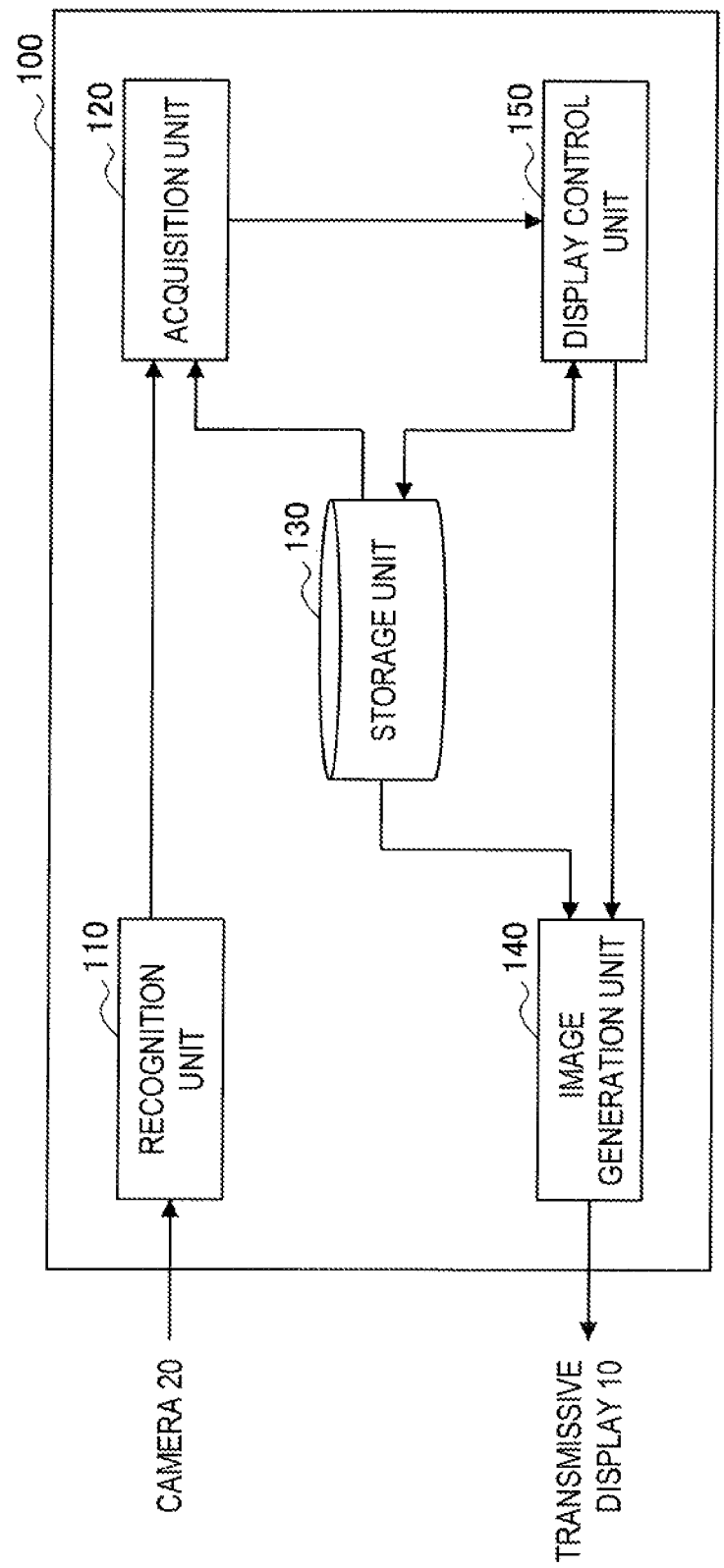
FIG. 7 is a block diagram illustrating an example of a logical configuration of a display control apparatus according to an embodiment.

First, an example of the logical configuration of the display control apparatus 100 according to this embodiment will be described with reference to FIGS. 7 to 10. FIG. 7 is a block diagram illustrating an example of the logical configuration of the display control apparatus 100 according to this embodiment. Referring to FIG. 7, the display control apparatus 100 includes a recognition unit 110, an acquisition unit 120, a storage unit 130, an image generation unit 140, and a display control unit 150.

Recognition Unit 110

The recognition unit 110 recognizes the relative position of the object 90 with respect to the transmissive display 10. For example, the recognition unit 110 recognizes the relative position of the object 90 with respect to the transmissive display 10 from a digital image acquired from the camera 20.

For example, the recognition unit 110 recognizes the relative position of the object 90 with respect to the transmissive display 10 by specifying the direction and the distance of the object 90 from the center of the transmissive display 10 on the xz plane (that is, the horizontal surface) shown in FIG. 1.

Figure 8:
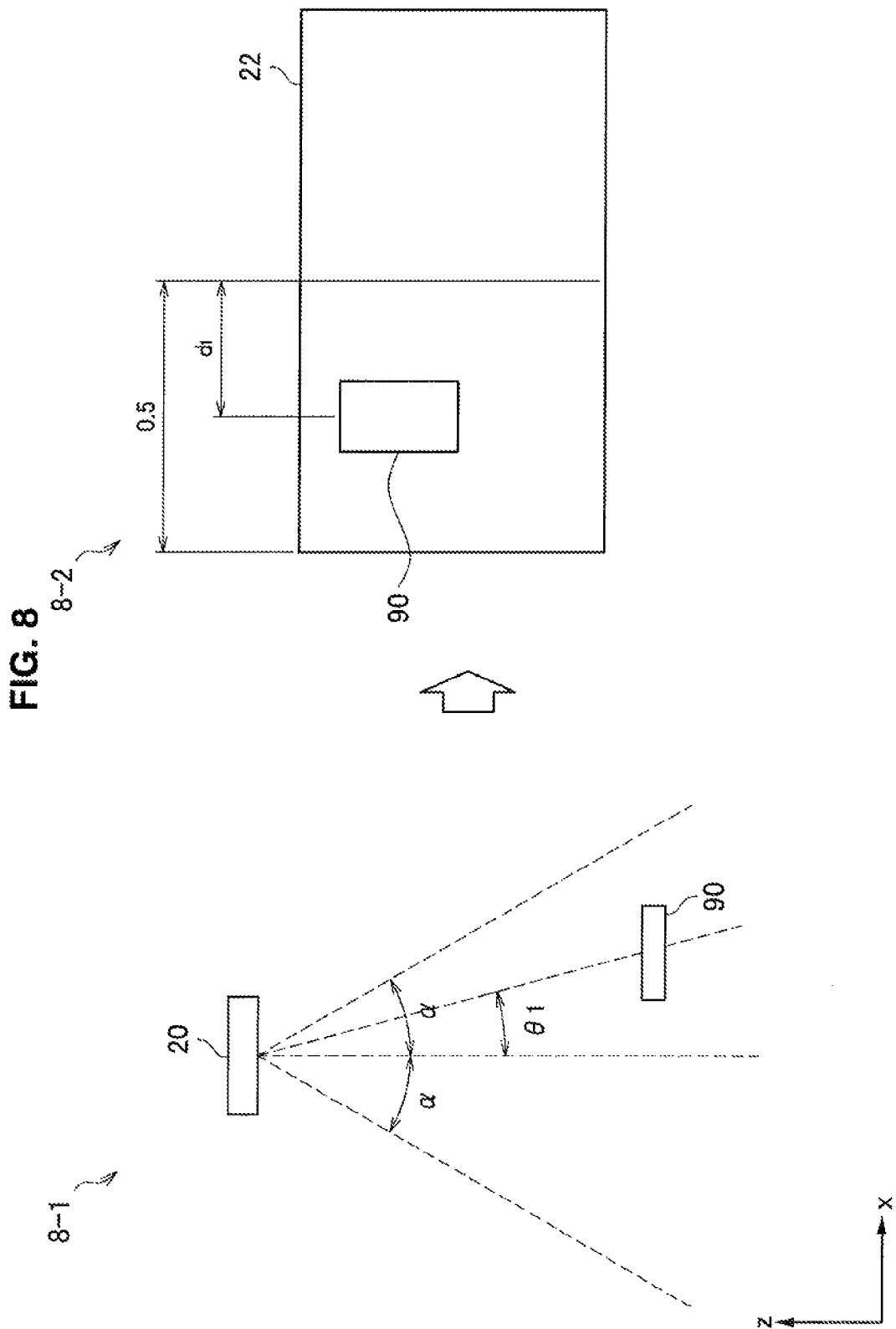
FIG. 8 is a diagram illustrating a method of specifying the direction of an object on an xz plane (horizontal plane)

First, a method of specifying the direction of the object 90 from the center of the transmissive display 10 will be described. FIG. 8 is a diagram illustrating the method of specifying the direction of the object 90 on the xz plane (horizontal plane). Referring to 8-1 of FIG. 8, the camera 20 has a horizontal image angle of $2\alpha$. The object 90 is located at an angle deviated by $\theta_1$ to the left from the center of the horizontal image angle of the camera 20. Here, as shown in FIG. 1, the camera 20 is provided at the same position as the center of the transmissive display 10 on the xz plane. Accordingly, on the xz plane, the object 90 is located at an angle deviated only $\theta_1$ from the straight line which is parallel to the z axis and passes through the center of the transmissive display 10. Accordingly, the direction of the object 90 from the center of the transmissive display 10 on the xz plane is expressed by the angle $\theta_1$. Further, the angle $\theta_1$ may be expressed as a positive value when the object 90 is deviated to the left, and the angle $\theta_1$ may be expressed as a negative value when the object 90 is deviated to the right, or vice versa.

Referring to 8-2 of FIG. 8, a digital image 22 imaged by the camera 20 is shown. The recognition unit 110 detects the object 90 in the digital image 22 and obtains a distance $d_1$ of the object 90 from the center of the digital image 22. For example, when it is assumed that the horizontal width of the digital image 22 is 1 (that is, half of the horizontal width is 0.5), the distance $d_1$ is a positive number less than 0.5. In this case, the following expression is satisfied.

[Equation 1]

$$\frac{\tan\theta_1}{d_1} = \frac{\tan\alpha}{0.5} \qquad \text{(Equation 1)}$$

When Equation 1 above is modified, the following equation can be obtained.

[Equation 2]

$$\theta_1 = a\tan\left(\frac{d}{0.5/\tan\alpha}\right) \quad \text{(Equation 2)}$$

Accordingly, the recognition unit 110 can obtain the angle $\theta_1$ using the distance $d_1$ and the given horizontal image angle $\alpha$. Thus, the recognition unit 110 can specify the direction $\theta_1$ of the object 90 from the center of the transmissive display 10 on the xz plane.

On the other hand, the recognition unit 110 measures the distance of the object 90 from the center of the transmissive display 10 based on the digital image supplied from the camera capable of measuring the distance of an object. For example, it is assumed that the distance between the camera 20 and the object 90 is recognized as $D_1$. Here, the object 90 is provided at the same position as the center of the transmissive display 10 on the xz plane. Accordingly, the distance of the object 90 from the center of the transmissive display 10 in the z-axis direction is $D_1$ which is the same as the distance between the camera 20 and the object 90. Thus, the distance of the object 90 from the center of the transmissive display 10 in the z-axis direction is expressed by $D_1$. Further, even when the position of the camera 20 is not the same as the center of the transmissive display 10 on the xz plane but the offset distance between the transmissive display 10 and the camera 20 is given, the distance between the transmissive display 10 and the object 90 can be specified by performing correction by the offset distance.

Figure 9:
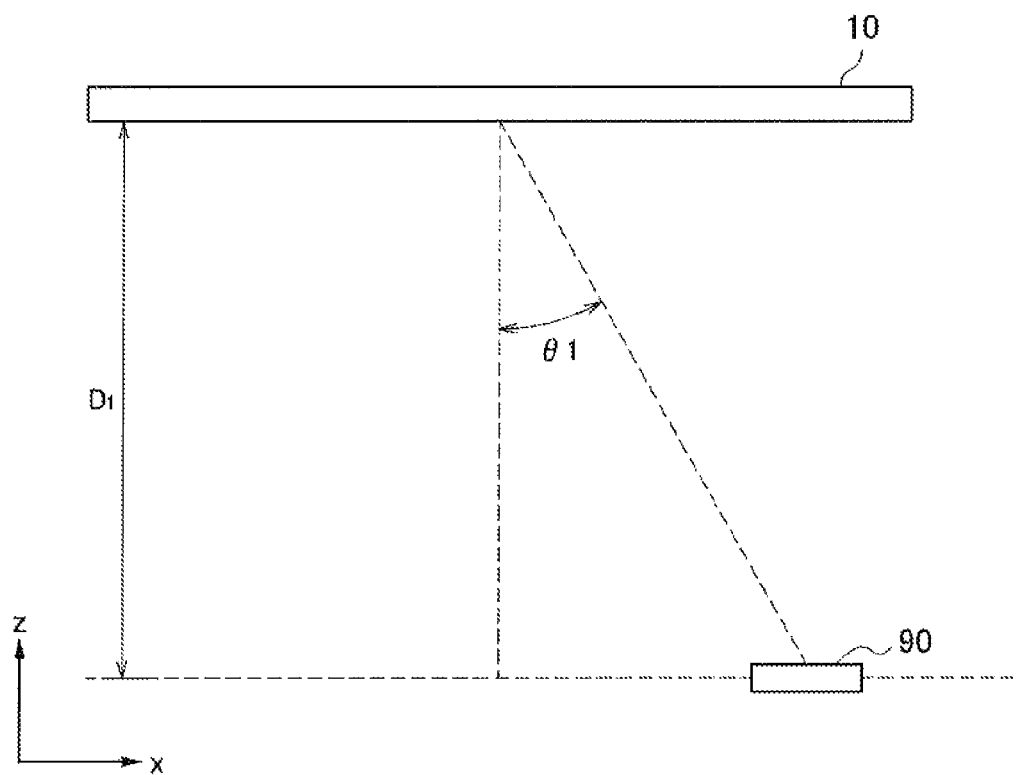
FIG. 9 is a diagram illustrating the position, of an object on the xz plane (horizontal plane)

As shown in FIG. 9, the recognition unit 110 recognizes the relative position of the object 90 with respect to the transmissive display 10 on the xz plane by specifying the direction $\theta_1$ and the distance $D_1$ of the object 90 from the center of the transmissive display 10.

Figure 10:
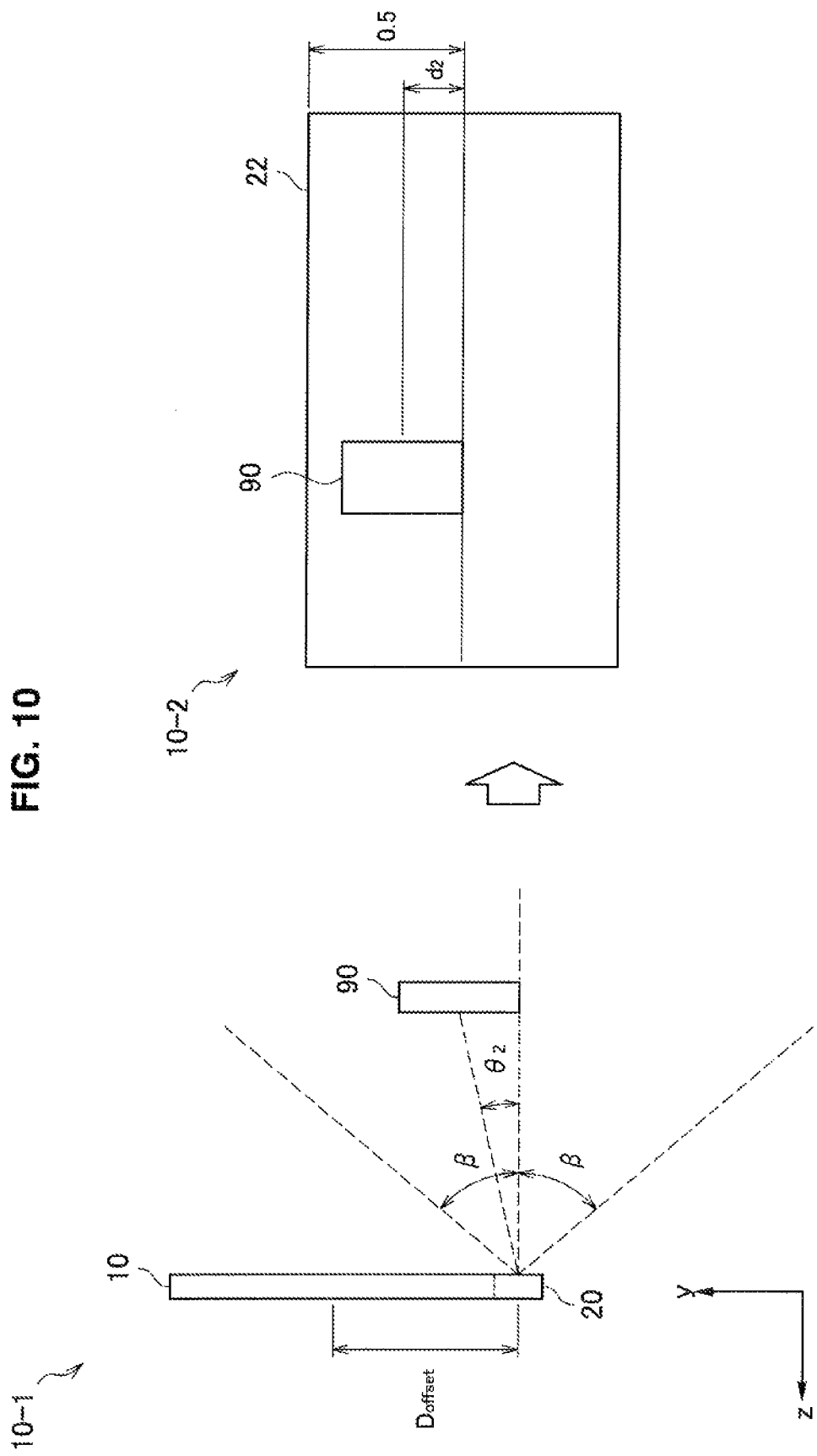
FIG. 10 is a diagram illustrating a method of specifying the direction of an object on a yz plane.

The relative position of the object 90 with respect to the transmissive display 10 on the xz plane has been described with reference to FIGS. 8 and 9. However, the relative position of the object 90 with respect to the transmissive display 10 may be recognized even on the yz plane. On the yz plane, as shown in FIG. 10, a vertical image angle $2\beta$ can be used instead of the horizontal image angle $2\alpha$ and a distance $d_2$ in the digital image 22 can be obtained instead of the distance $d_1$ in the digital image 22. Thus, a direction $\theta_2$ of the object 90 with respect to the camera 20 can be obtained by the above-described method. The distance $D_1$ (that is, the distance in the z-axis direction) of the object from the center of the camera 20 (or the transmissive display 10) is likewise used even on the yz plane. On the yz plane, however, the position of the camera 20 and the position of the center of the transmissive display 10 are different from each other by an offset distance $D_{offset}$ in the y-axis direction. Accordingly, a position corrected in the y-axis direction by the offset distance $D_{offset}$, which is obtained from the direction $\theta_2$ and the distance $d_1$, from the relative position of the object 90 with respect to the camera 20 becomes the relative position of the object 90 with respect to the transmissive display 10 on the yz plane.

The recognition of the relative position of the object 90 with respect to the transmissive display 10 using the digital image has been described above, but this embodiment is not limited thereto. For example, the relative position of the object 90 with respect to the transmissive display 10 may be recognized using information obtained from another apparatus, such as an infrared sensor, a pressure sensor, or a reception apparatus other than the camera, which receives radio waves from a transmitter included in the object 90.

The recognition unit 110 may also recognize the size of the object 90.

The recognition unit 110 may recognize the relative position of the person with respect to the transmissive display 10. For example, the recognition unit 110 may recognize the relative position of the person with respect to the transmissive display 10 from a digital image obtained from an additional camera different from the camera 20 or separate information obtained from another apparatus such as an infrared sensor or a pressure sensor.

Further, the recognition unit 110 may recognize a distance (hereinafter referred to as a "touch distance") between the transmissive display 10 and a person or a part (for example, a hand) of the body of the person from the digital image obtained from the additional camera or the information obtained from another apparatus such as an infrared sensor or a pressure sensor.

Acquisition Unit 120

The acquisition unit 120 acquires position information indicating the relative positional relation between the transmissive display 10 and the object 90 located on the surface of the first surface (that is, the direction B in FIG. 6) of the transmissive display 10. The position information is any given information indicating the relative positional relation between the transmissive display 10 and the object 90. For example, the position information is information indicating the relative position of the object 90 with respect to the transmissive display 10. In this case, for example, as shown in FIG. 9, the relative position of the object 90 with respect to the transmissive display 10 is expressed by the direction $\theta_1$ and the distance $D_1$ of the object 90 from the center of the transmissive display 10. Instead, the position information may be information indicating the positions of the transmissive display 10 and the object 90 with respect to the origin set at one position. The positions of the transmissive display 10 and the object 90 are not limited to the central points, but may be any point among the central points or any point in the vicinity of the central points. Any point may include two or more points or may be in the range including two or more points. The position information may be information including the size of the object 90. The position information may include not only the relative positional relation on the xz plane (that is, the horizontal surface) but also the relative position information on the yz plane.

More specifically, for example, the acquisition unit 120 acquires the relative position of the object 90 with respect to the transmissive display 10 from the recognition unit 110. When the recognition unit 110 recognizes the position of a person located on the side of the second surface (that is, the direction A in FIG. 6) of the transmissive display 10 with respect to the transmissive display 10, the acquisition unit 120 may acquire the relative position of the person with respect to the transmissive display 10 from the recognition unit 110. That is, the acquisition unit 120 may acquire expanded position information indicating the relative positional relation between the transmissive display 10 and the person and the object 90. The acquisition unit 120 may additionally acquire the size of the object 90.

The acquisition unit 120 may additionally acquire a touch distance as a first distance between the transmissive display 10 and a person or a part of the body of the person. For example, the acquisition unit 120 may acquire the touch distance from the recognition unit 110.

Storage Unit 130

The storage unit 130 stores information temporarily or permanently stored for the display control apparatus 100. For example, the storage unit 130 stores information necessary, to generate a display image displayed on the screen 200 of the transmissive display 10. For example, the storage unit 130 stores a display position and a display attribute for a stereoscopic view of the display object 230 which is displayed to be stereoscopically viewed.

Here, the display position for the stereoscopic view refers to, for example, a position of the display object 230 perceived from the viewpoint position 80 for the stereoscopic view in a three-dimensional space. In this case, the display position for the stereoscopic view may be coordinates (for example, coordinates (x, y, z)) of a three-dimensional space including the coordinates (for example, coordinates (x, y)) of the screen 200 and a depth (for example, z) of the screen 200 from the screen 200 in a direction perpendicular to the screen 200. Further, the display position for the stereoscopic view may be the display position of a left-eye object in the screen 200 (or a left-eye image) and the display position of a right-eye object in the screen 200 (or a right-eye image).

The display attribute for the stereoscopic view refers to any attribute, such as transparency, a color, a display ON/OFF state, a size, a shape, an aspect ratio, or a rotation angle of the display object 230, regarding the display of the display object 230. The shape may be a three-dimensional shape in a space. The rotation angle may be a three-dimensional rotation angle in a space.

The display position and the display attribute of the display object 230 for the stereoscopic view may be determined or modified in the display control of the display control unit 150.

The relative position of the person with respect to the transmissive display 10 may be recognized by the recognition unit 110 and may be stored in the storage unit 130. In this case, the recognition unit 110 may reduce the frequency of the recognition on the assumption that the person does not frequently move. The storage unit 130 may additionally store the size of the object 90. The size of the object 90 may be set by an administrator of the display control apparatus 100 or may be recognized by the recognition unit 110.

The storage unit 130 may store progress of a change in the positional relation to be measured between the transition display 10 and the object 90 or may store progress of a change in the depth (or the position) of the display object 230 to be measured.

Image Generation Unit 140

The image generation unit 140 generates a display image to be displayed on the screen 200 of the transmissive display 10 under the control of the display control unit 150. For example, the image generation unit 140 generates a display image, such as a menu, a figure, text, an icon, or a window, including the display object 230.

In particular, the image generation unit 140 generates right-eye and left-eye images as the display image. For example, the image generation unit 140 generates the right-eye image including the right-eye object and the left-eye image including the left-eye object based on the display position and the display attribute of the display object 230 for the stereoscopic view stored in the storage unit 130. Here, for example, the display position for the stereoscopic view is a position (for example, coordinates (x, y, z)) of the display object 230, which is perceived from the viewpoint position 80 for the stereoscopic view, in a three-dimensional space. From the position of the display object 230 in the three-dimensional space, the image generation unit 140 may specify the display position of the left-eye object in the screen 200 (or the left-eye image) and the display position of the right-eye object in the screen 200 (or the right-eye image). Further, the image generation unit 140 may directly generate the left-eye image including the left-eye object 230 and the right-eye image including the right-eye object 230 by performing rendering for the stereoscopic view based on the position of the display object 230 in the three-dimensional space. The display position for the stereoscopic view may be the display position of the left-eye object in the screen 200 (or the left-eye image) and the display position of the right-eye object in the screen 200 (or the right-eye image). The image generation unit 140 may generate the right-eye image including the right-eye object and the left-eye image including the left-eye object from the display positions of the right-eye and left-eye objects. The image generation unit 140 outputs the right-eye and left-eye images to the transmissive display 10.

Display Control Unit 150

The display control unit 150 controls the display of the transmissive display 10. In this embodiment, the display control unit 150 changes the depth of the display object 230 from the screen 200, which is perceived from the viewpoint position 80, in accordance with a change in the relative positional relation between the transmissive display 10 and the object 90 in the position information, the display object 230 being displayed to be stereoscopically viewed. Specifically, for example, the display control unit 150 changes the depth of the display object 230 by changing the offset in the right and left directions between the display positions of the right-eye and left-eye objects in the screen 200. An example of specific display control of the display control unit 150 will be described below in "2.2. Display Control Unit."

2.2. Display Control Unit

Next, an example of the specific display control of the display control apparatus 100 according to this embodiment will be described with reference to FIGS. 11 to 26. The basic control of the depth will be first described, and then control of the progress of the change in the depth and the control of prevention of collision with the transmissive display will be described.

Basic Control of Depth

As the basic control of the depth, as described above, the display control unit 150 changes the depth of the display object 230 from the screen 200, which is perceived from the viewpoint position 80, in accordance with the change in the relative positional relation between the transmissive display 10 and the object 90 in the position information.

For example, the display control unit 150 changes the depth of the display object 230 from the screen 200, which is perceived from the viewpoint position 80, by changing the display position of the display object 230 for the stereoscopic view stored in the storage unit 130. As described above, for example, the display position for the stereoscopic view is a position (for example, coordinates (x, y, z)) of the display object 230, which is perceived from the viewpoint position 80 for the stereoscopic view, in a three-dimensional space. In this case, the display control unit 150 changes the depth of the display object 230 by changing the position of the display object 230 in the three-dimensional space in a direction in which the display object 230 becomes closer to the viewpoint position 80 or a direction in which the display object 230 is moved farther away from the viewpoint position 80. Thus, when the right-eye and left-eye images are generated based on the position of the display object 230 in the three-dimensional space, the offset in the right and left directions between the display positions of the right-eye and left-eye objects of the display object 230 in the screen 200 is changed. As a result, the depth of the display object 230 perceived from the viewpoint position 80 is changed. As described above, the display position for the stereoscopic view may be the display position of the left-eye object in the screen 200 (or the left-eye image) and the display position of the right-eye object in the screen 200 (or the right-eye image). In this case, the display control unit 150 may directly change the offset between the display positions of the right-eye and left-eye objects. As a result, the depth of the display object 230 perceived from the viewpoint position 80 is changed.

Figure 11:
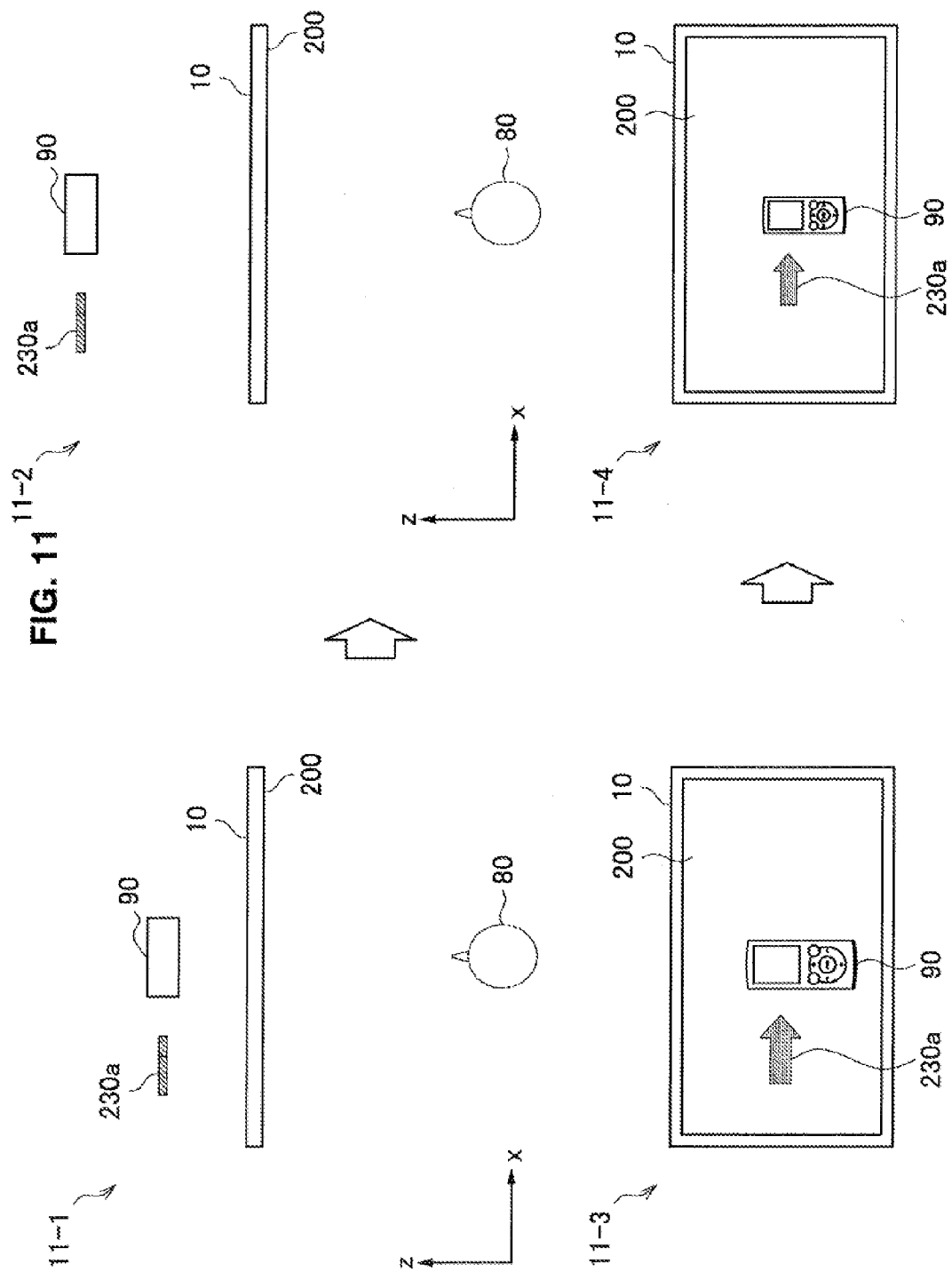
FIG. 11 is a diagram illustrating an example of a change in the depth of a display object.

FIG. 11 is a diagram illustrating an example of a change in the depth of the display object 230. As shown in 11-1 and 11-3 of FIG. 11, the display object 230a indicating the object 90 is displayed to be stereoscopically viewed. In 11-1 of FIG. 11, the display object 230a is shown in the vicinity of the object 90. However, this indication is used to show the depth of the display object 230a perceived from the viewpoint position 80 and does not mean that the display object is actually present at the position. As described above in FIG. 5, the right-eye and left-eye objects are actually displayed as the display object 230 on the screen 200. In the drawings referred to in the following description, the same indication is used. Referring back to FIG. 11, the depth of the display object 230a is perceived as substantially the same depth as the actual depth of the object 90 from the transmissive display 10. Accordingly, the display object 230a seems to be located in the vicinity of the object 90 from the viewpoint position 80. Here, as shown in 11-2 and 11-4 of FIG. 11, for example, the object 90 is moved in a direction in which the object 90 is moved farther away from the transmissive display 10. In this case, the display control unit 150 allows the depth of the display object 230a to be deep in accordance with the change in the position of the object 90. As a result, for example, as shown in 11-2 and 11-4 of FIG. 11, the depth of the display object 230a is perceived again as substantially the same depth as a new depth of the object 90 from the transmissive display 10.

Figure 12:
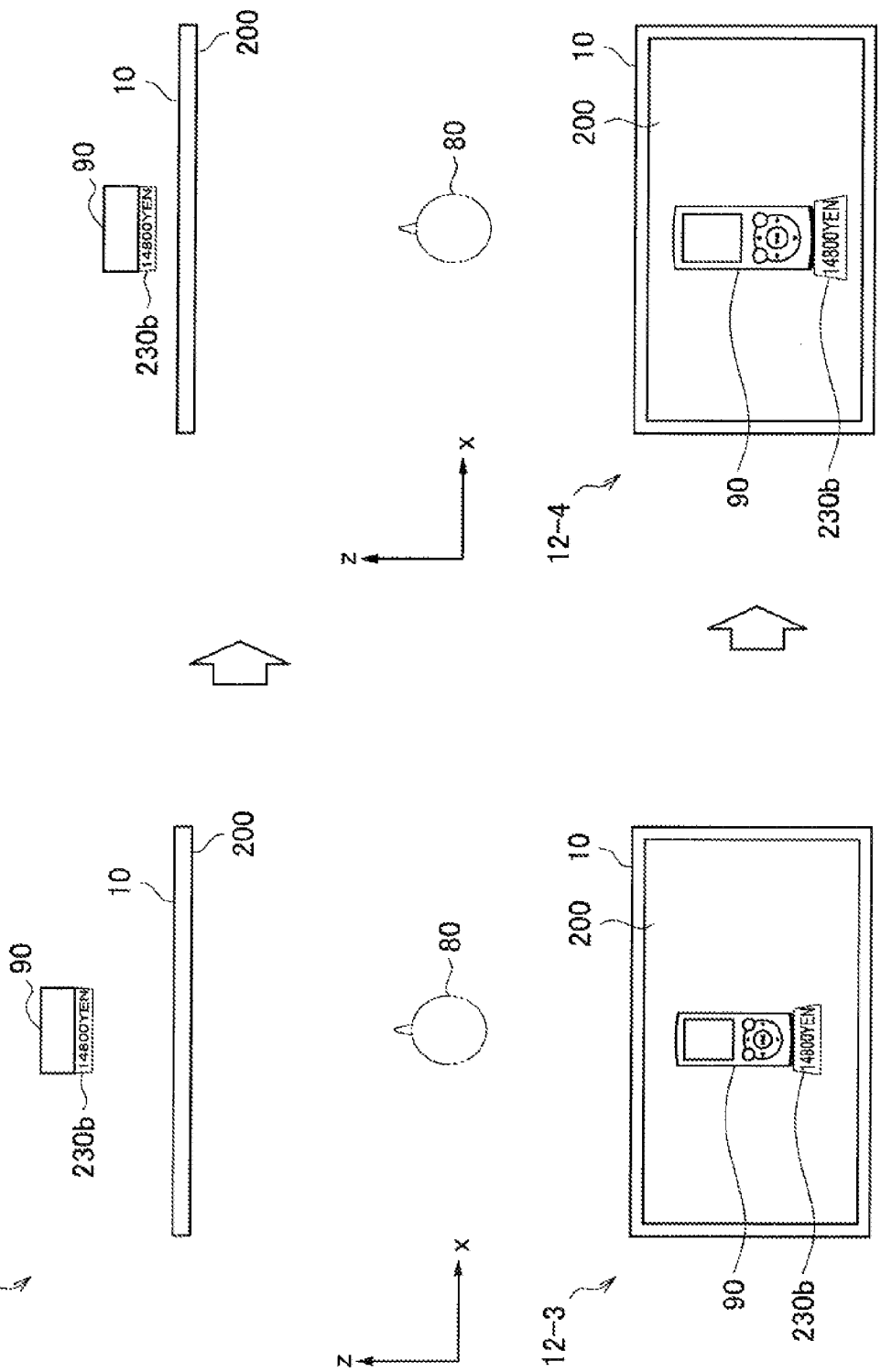
FIG. 12 is a diagram illustrating another example of the change in the depth of a display object.

FIG. 12 is a diagram illustrating another example of the change in the depth of the display object 230. As shown in 12-1 and 12-3 of FIG. 12, a display object 230b representing a price tag of the object 90 is displayed to be stereoscopically viewed. Here, the depth of the display object 230b is perceived as a depth slightly shallower than the actual depth of the object 90 from the transmissive display 10. Accordingly, the display object 230b seems to be located in the front of the object 90 from the viewpoint position 80. As shown in 12-2 and 12-4 of FIG. 12, for example, the object 90 is moved in the direction in which the object 90 becomes closer to the transmissive display 10. In this case, for example, the display control unit 150 allows the depth of the display object 230b to be shallower according to the change in the position of the object 90. As a result, for example, as shown in 11-2 and 11-4 of FIG. 11, the depth of the display object 230b is perceived again as the depth slightly shallower than the new depth of the object 90 from the transmissive display 10.

As described above with reference to FIGS. 11 and 12, the display object 230 can follow the object 90 by changing the depth of the display object 230 in accordance with the change in the relative positional relation between the transmissive display 10 and the object 90. That is, the depth perceived between the display object 230 and the object 90 can be made to be closer. Accordingly, the person can view the object 90 and the display object 230 together without considerable change of the focus. As a result, it is easier for the person to view the object 90 and the display object 230 together and it is possible to reduce the burden on the eyes of the person.

The display control unit 150 may further change the position of the display object 230 other than the depth perceived from the viewpoint position 80 in accordance with the position information. FIG. 13 is a diagram illustrating an example of the change in the position of the display object 230. As shown in 13-1 and 13-3 of FIG. 13, the display object 230b representing the price tag of the object 90 is displayed to be stereoscopically viewed. Here, the depth of the display object 230b is perceived as the depth slightly shallower than the actual depth of the object 90 from the transmissive display 10. Accordingly, the display object 230b appears to be located in the front of the object 90 from the viewpoint position 80. Here, as shown in 13-2 and 13-4 of FIG. 13, for example, the object 90 is moved to the left when viewed from the viewpoint position 80 in the x-axis direction, while the object 90 is moved in the direction in which the object 90 becomes closer to the transmissive display 10 in the z-axis direction. In this case, the display control unit 150 also changes the position of the display object 230b in the x-axis direction when viewed from the viewpoint position 80, while making the depth of the display object 230b shallower, in accordance with the change of the position of the object 90. As a result, for example, as shown in 13-2 and 13-4 of FIG. 13, the depth of the display object 230b is perceived again as the depth slightly shallower than a new depth of the object 90 from the transmissive display 10. Further, the position of the display object 230b in the right and left directions is perceived as almost the same position as the object 90.

As described above with reference to FIG. 13, the display object 230 can follow the object 90 in addition to the depth direction by further changing the position of the display object 230, which is perceived from the viewpoint position 80, other than depth based on the position information. That is, the position in the right and left directions perceived between the display object 230 and the object 90 can be closer. Accordingly, the person can view the object 90 and the display object 230 together without considerable movement of the eyes in the right and left directions. As a result, it is easier for the person to view the object 90 and the display object 230 together and it is possible to reduce the burden on the eyes of the person.

Figure 14:
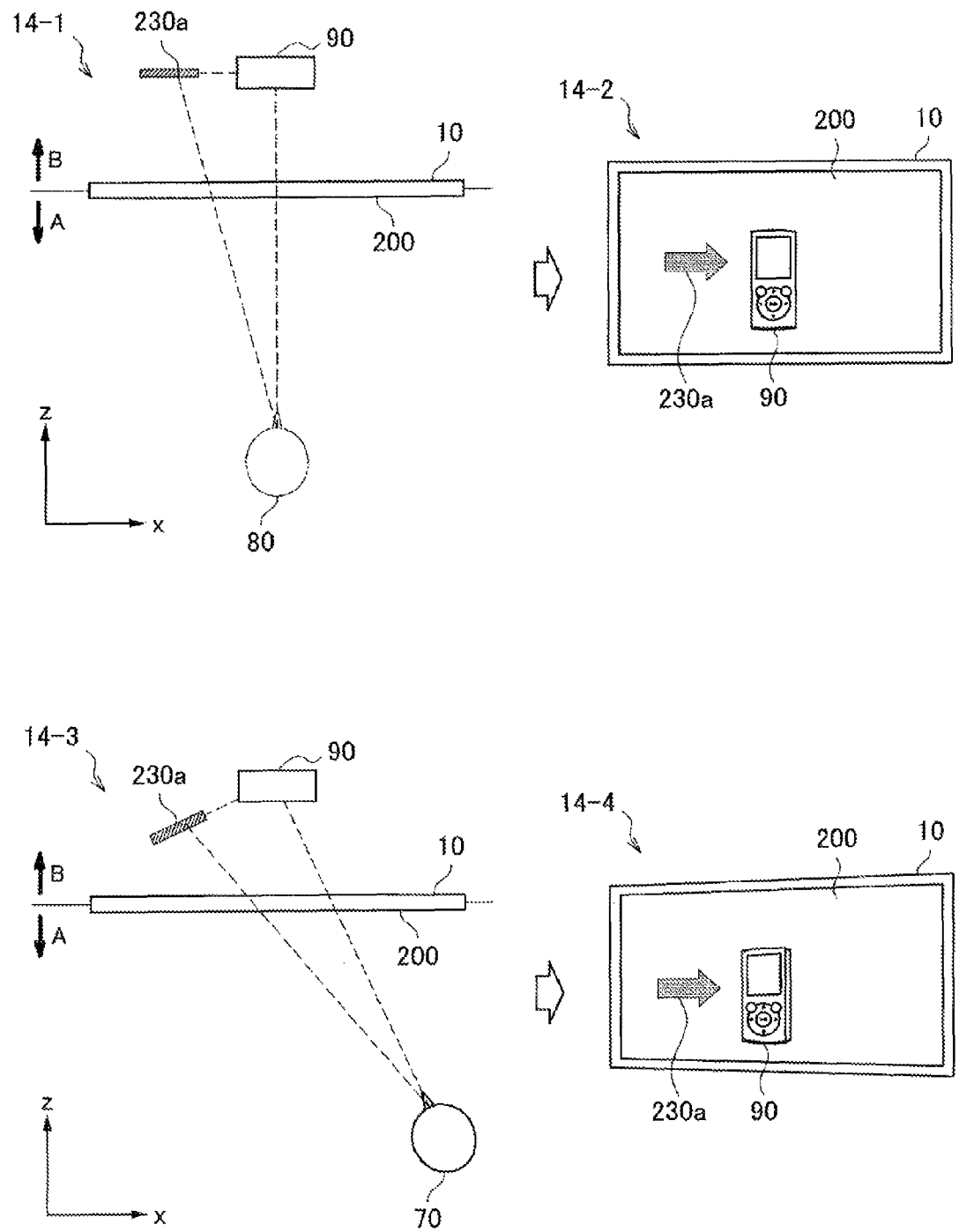
FIG. 14 is a diagram illustrating an example of display of a display object in accordance with the position of a person.

When the acquisition unit 120 acquires the relative positional relation between the transmissive display 10 and the person located on the side of the second surface of the transmissive display 10, in other words, when the acquisition unit 120 acquires the expanded position information, the display control unit 150 may use the expanded position information. That is, the display control unit 150 may change the depth of the display object 230 from the screen 200, which is perceived from the position of the person, in accordance with the change in the positional relation in the expanded position information. FIG. 14 is a diagram illustrating an example of the display of the display object 230 in accordance with the position of the person. As shown in 14-1 and 14-2 of FIG. 14, the display object 230a is viewed from the set viewpoint position 80. As shown in 14-1 of FIG. 14, for example, the display object 230a is displayed to be shown at a position slightly deviated from the object 90 in the x-axis direction, when the display object 230a is shown from the set viewpoint position 80. As a result, as shown in 14-2 of FIG. 14, the display object 230a seems to indicate the object 90 from the left from the viewpoint position 80. On the other hand, as shown in 14-3 and 14-4 of FIG. 14, the display object 230a can be shown from the acquired position 70 of the person. As shown in 14-3 of FIG. 14, for example, the display object 230a is displayed to be shown at a position slightly deviated in the x-axis and y-axis directions from the object 90, when the display object 230a is shown from the acquired position 70 of the person. As a result, as shown in 14-4 of FIG. 14, the display object 230a seems to indicate the object 90 from the left when the display object 230a is shown from the actual position 70 of the person deviated from the set viewpoint position 80. Thus, the display image (the right-eye and left-eye images) allowing the person to perceive a desired position (including the depth) of the display object 230 can be displayed to be viewed at the position 70 of the person by using the actual position 70 of the person without the assumption of the fixed viewpoint position 80. As a result, it is easier for the person to view the object 90 and the display object 230 together and it is possible to reduce the burden on the eyes of the person.

Control of Progress of Change in Depth

Next, the control of the progress of the change in the depth by the display control unit 150 will be described. The display control unit 150 changes the depth of the display object 230 so as to satisfy a constraint condition regarding the progress of the change in the depth of the display object 230. That is, the constraint condition regarding a change in the depth of the display object 230 is set, and thus the depth of the display object 230 is changed within the range satisfying the constraint condition.

For example, a first example of the constraint condition is that a change amount of depth of the display object 230 per predetermined time is less than a predetermined change amount. That is, the display control unit 150 changes the depth of the display object 230 so that the change amount of depth of the display object 230 per predetermined time is less than the predetermined change amount.

Figure 15:
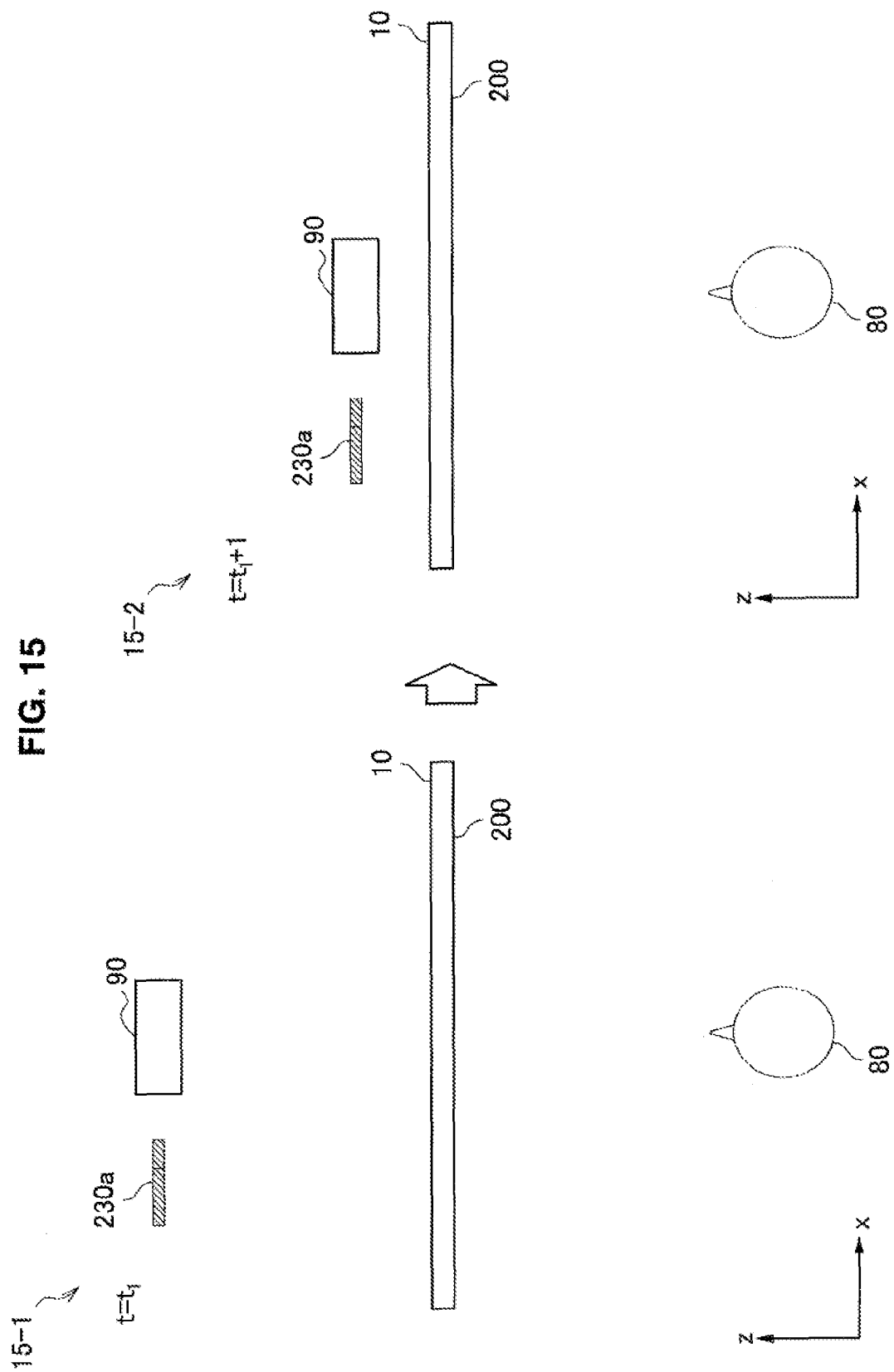
FIG. 15 is a first diagram illustrating an example of a change amount of a depth causing a burden on eyes.
Figure 16:
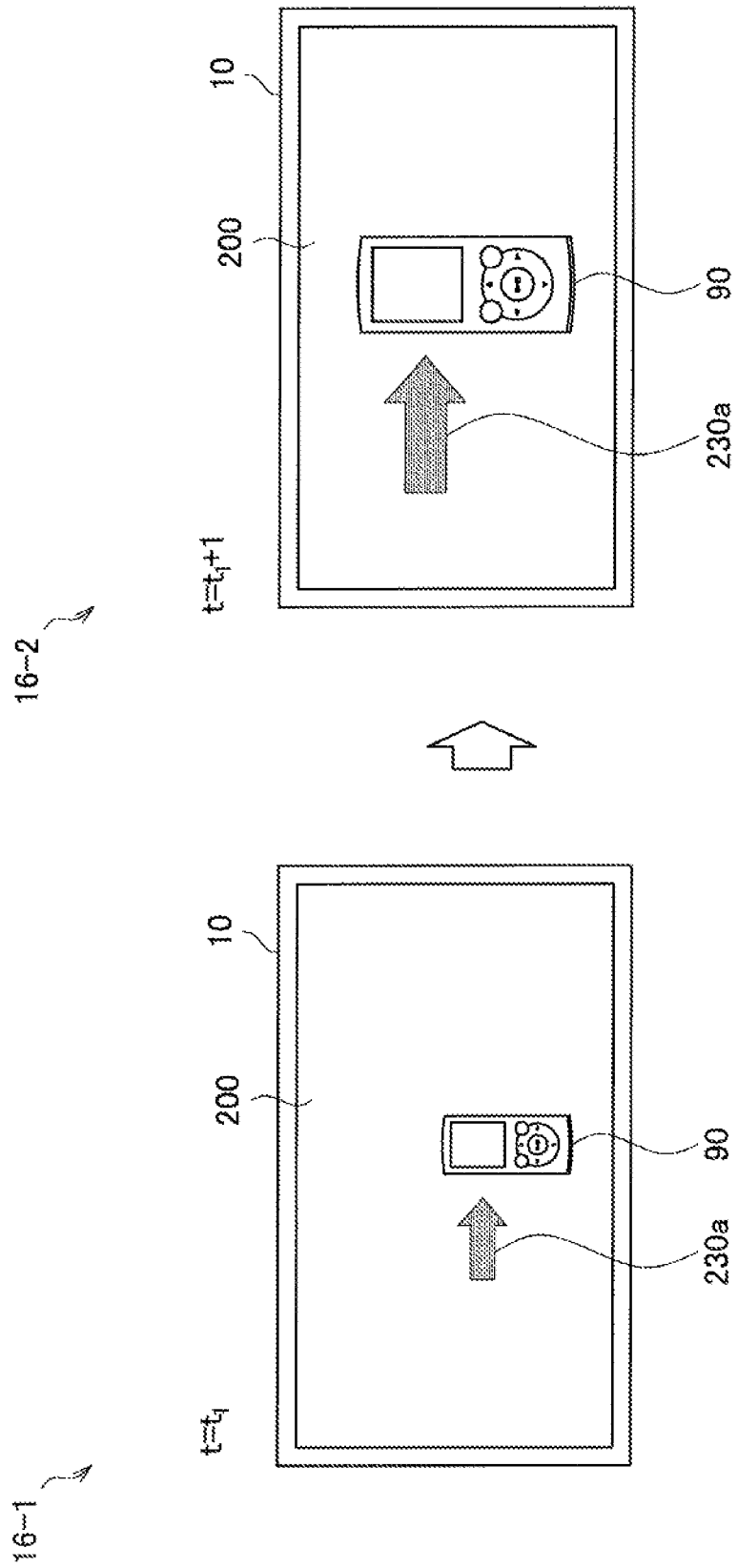
FIG. 16 is a second diagram illustrating an example of the change amount of the depth causing a burden on eyes.

FIGS. 15 and 16 are diagrams illustrating an example of the change amount of the depth causing a burden on eyes. As shown in 15-1 and 15-2 of FIG. 15, the object 90 is moved rapidly in a direction in which the object 90 becomes closer to the transmissive display 10, for example, by a person operating the object 90 when a time elapses from a given time $t_1$ to a time $t_1+1$. Then, the depth of the display object 230a also becomes rapidly shallower in accordance with the change in the position of the object 90. In this case, as shown in 16-1 and 16-2 of FIG. 16, the display object 230a seems to fly rapidly and abruptly toward the viewpoint position 80. Then, the person who views the flying display object 230 at the viewpoint position 80 moves the muscles of his or her eyes to focus on the abruptly flying display object 230. For this reason, the burden on the eyes of the person is caused.

Figure 17:
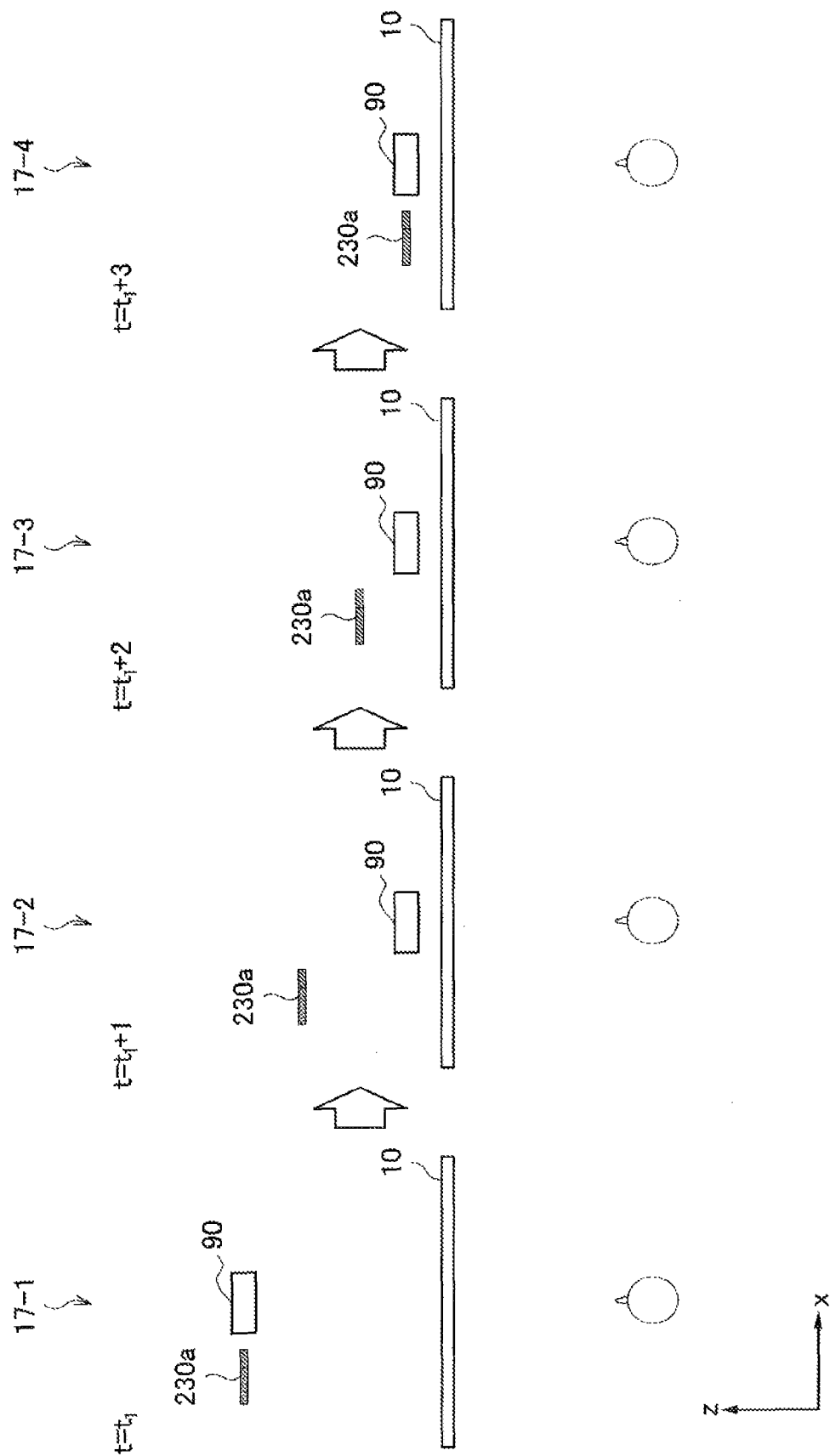
FIG. 17 is a first diagram illustrating an example of a change amount of a depth under a constraint condition.
Figure 18:
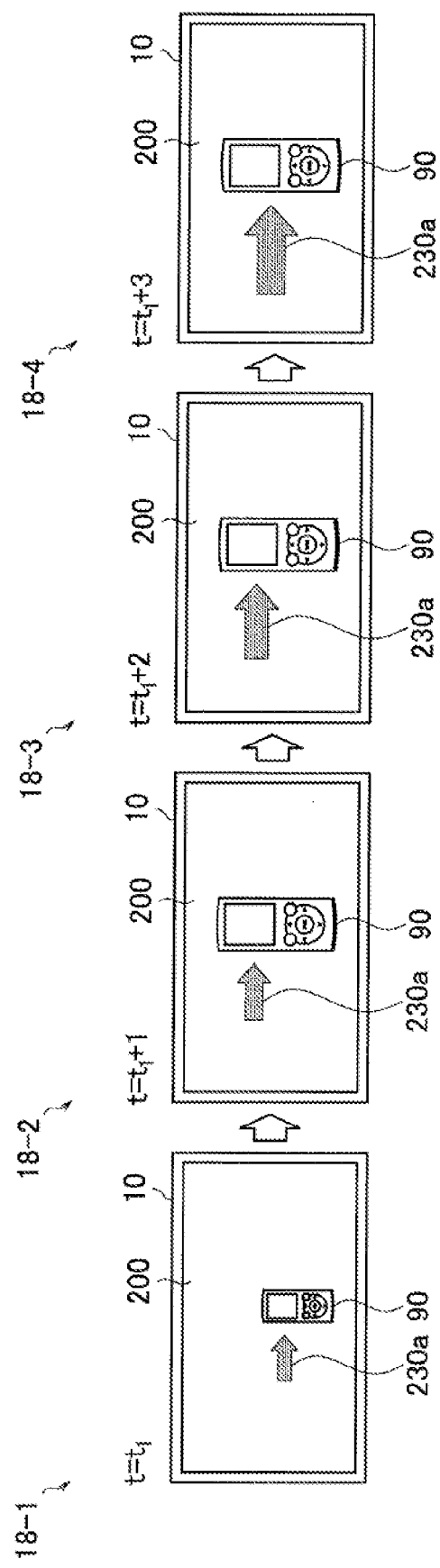
FIG. 18 is a second diagram illustrating an example of the change amount of the depth under the constraint condition.

FIGS. 17 and 18 are diagrams illustrating an example of a change amount of depth under a constraint condition. As shown in 17-1 and 17-2 of FIG. 17, the object 90 is rapidly moved in the direction in which the object 90 becomes closer to the transmissive display 10 when the time elapses from the given time t1 to the time $t_1+1$. Then, the display control unit 150 determines that the change amount per predetermined time is equal to or greater than the predetermined change amount when the display control unit 150 changes the depth of the display object 230a at once in accordance with the change in the object 90 with respect to the transmissive display 10. Therefore, as shown in 17-1 to 17-4 of FIG. 17, the display control unit 150 gradually changes the depth of the display object 230a during a time from the given time $t_1$ to a time $t_1+3$. In this case, as shown in 18-1 to 18-4 of FIG. 18, the display object 230a seems to fly slowly at the viewpoint position 80. Thus, by allowing the change amount of depth of the display object 230 per predetermined time to be less than the predetermined change amount, it is possible to prevent the excessive burden on the eyes of the person who views the display object 230 due to the change in the depth of the display object 230 rapidly. That is, it is possible to reduce the burden on the eyes of the person who views the display object 230.

Next, a second example of the constraint condition is that the number of times switching occurs between an increase and a decrease in the depth of the display object 230 per predetermined time is less than a predetermined number of times. That is, the display control unit 150 changes the depth of the display object 230 so that the number of times switching occurs between the increase and the decrease in the depth per predetermined time is less than the predetermined number of times.

Figure 19:
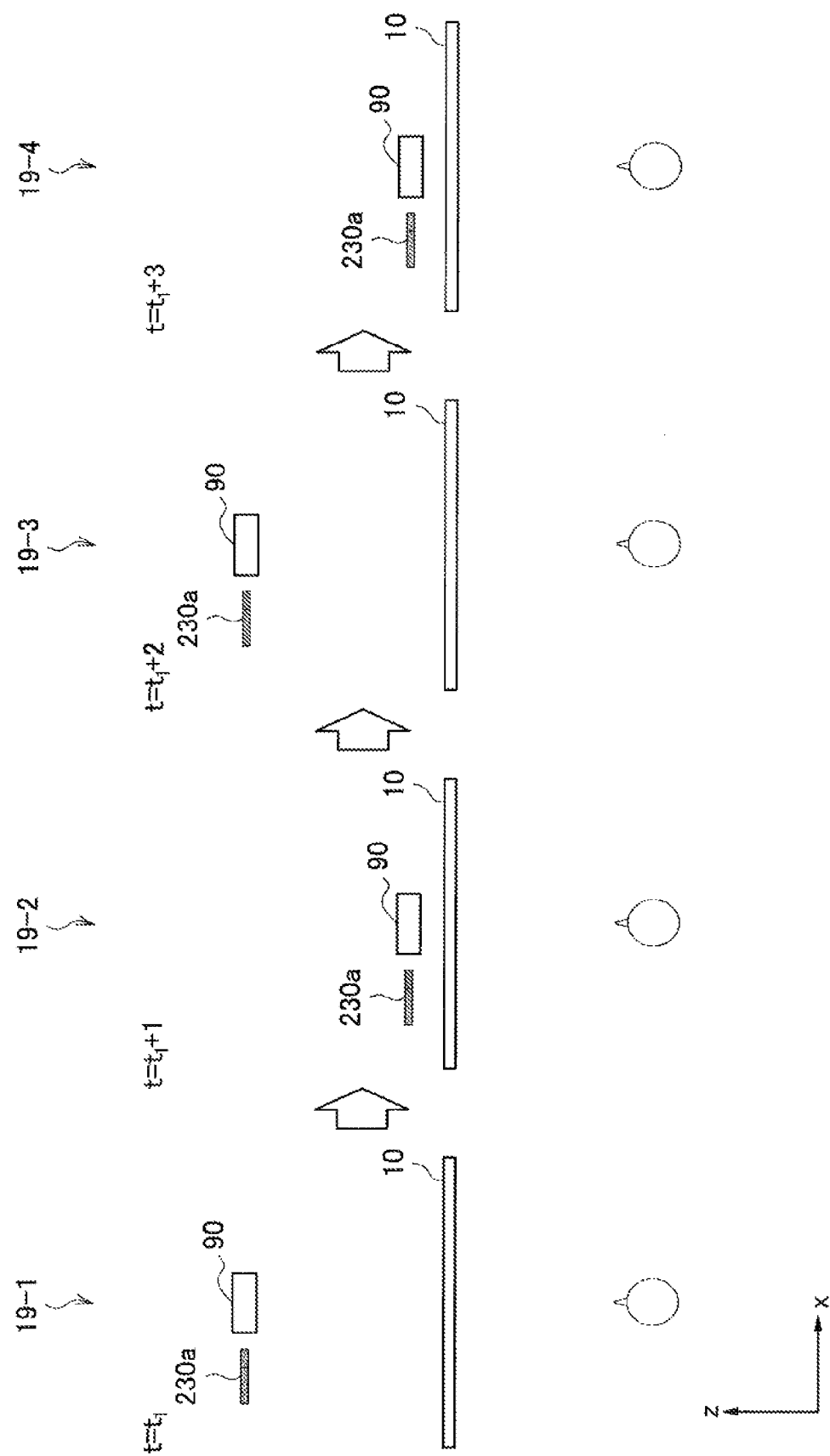
FIG. 19 is a first diagram illustrating an example of switch between an increase and a decrease in a depth causing a burden on eyes.
Figure 20:
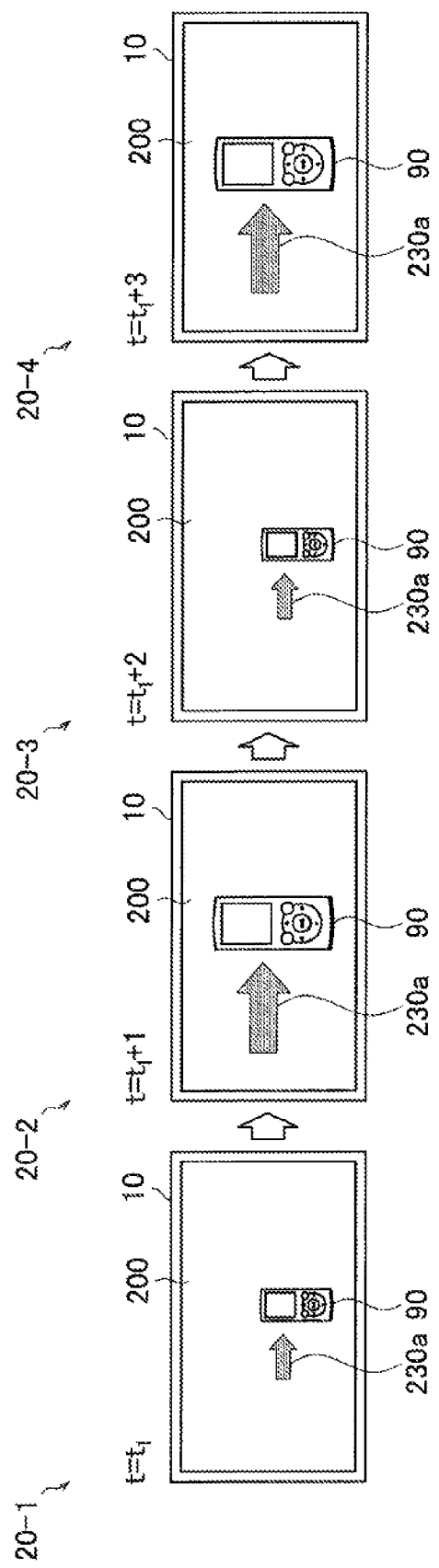
FIG. 20 is a second diagram illustrating an example of switch between the increase and the decrease in the depth causing a burden on eyes.

FIGS. 19 and 20 are diagrams illustrating an example of the switch between an increase and a decrease in the depth causing a burden on eyes. As shown in 19-1 to 19-4 of FIG. 19, the object 90 fluctuates with respect to the person, and thus is repeatedly moved in directions in which the object 90 becomes farther away from and becomes closer to the transmissive display 90 during a time from the given time $t_1$ to the time $t_1+3$. Then, the depth of the display object 230a also repeatedly increases and decreases in accordance with the change in the object 90. In this case, as shown in 20-1 to 20-4 of FIG. 20, the display object 230a seems to be repeatedly moved forward and backward at the viewpoint position 80. Therefore, the person who views the display object 230a moving forward and backward at the viewpoint position 80 repeatedly moves the muscles of his or her eyes to focus on the display object 230 repeatedly moved forward and backward. As a result, the burden on the eyes of the person is caused.

Figure 21:
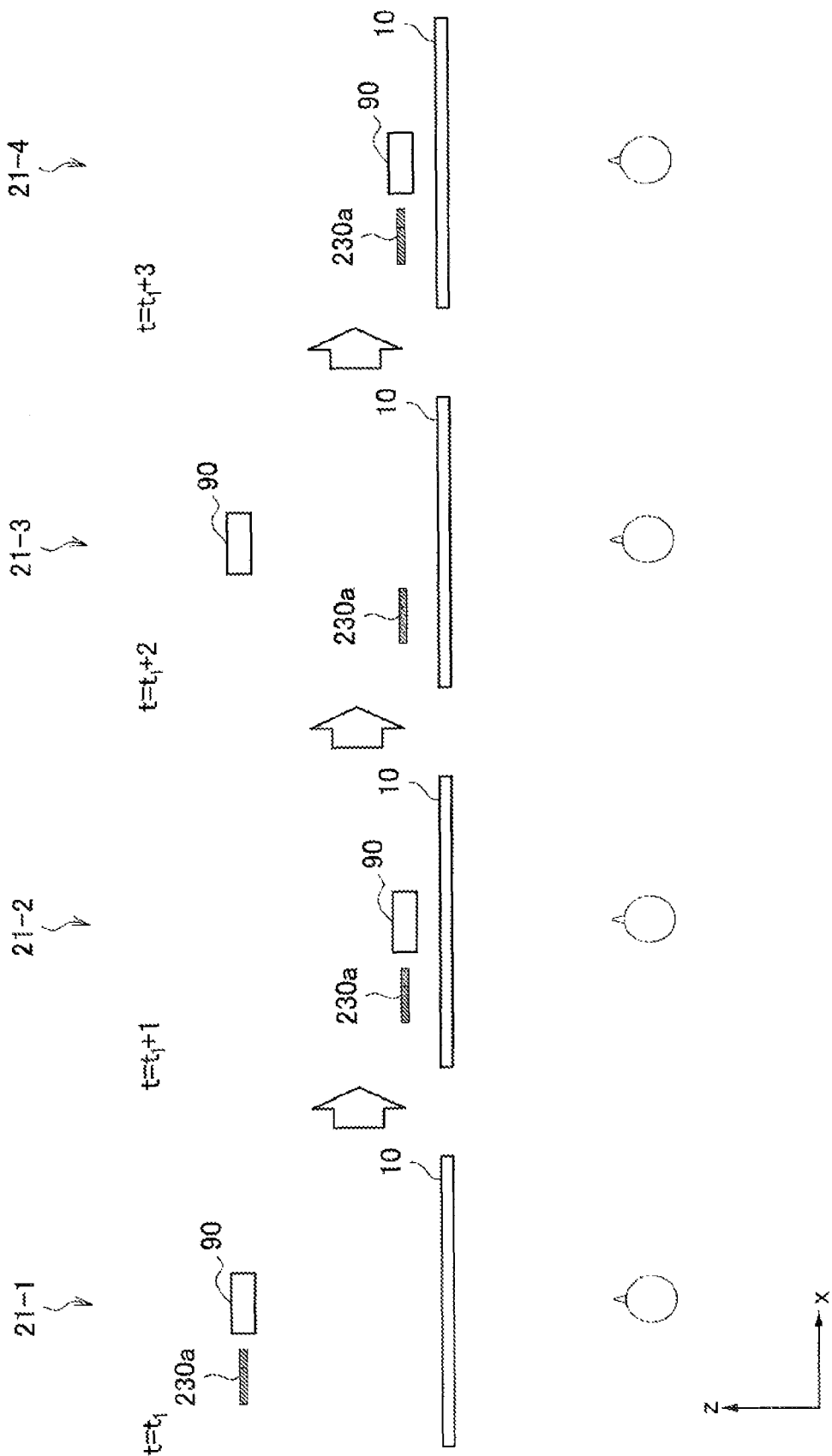
FIG. 21 is a first diagram illustrating an example of switch between an increase and a decrease in a depth under a constraint condition.
Figure 22:
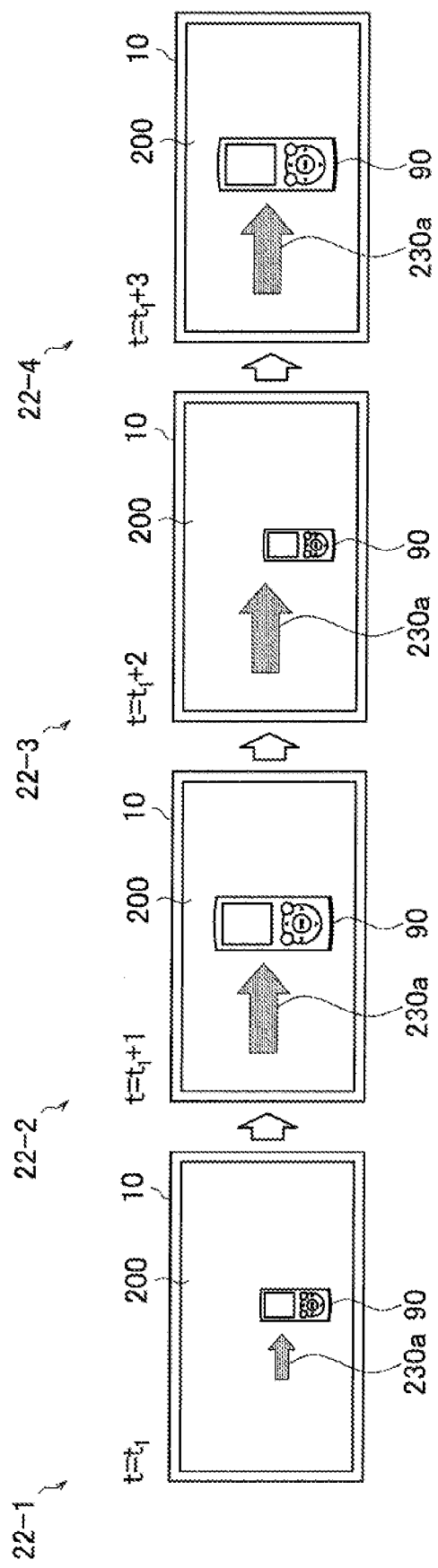
FIG. 22 is a second diagram illustrating an example of the switch between the increase and the decrease in the depth under the constraint condition.

FIGS. 21 and 22 are diagrams illustrating an example of the switch between the increase and the decrease in the depth under a constraint condition. As shown in 21-1 to 21-4 of FIG. 21, the object 90 is repeatedly moved in the directions in which the object 90 becomes closer to and farther away from the transmissive display 10 during a time from the given time $t_1$ to the time $t_1+3$. Here, the constraint condition is that the number of switches is less than one (that is, the switch does not occur) while t increases by 5. Accordingly, when the display control unit 150 changes the depth in accordance with the change in the position of the object 90 with respect to the transmissive display 10, the display control unit 150 determines that the number of times switching occurs between the increase and the decrease in the depth of the display object per predetermined time is equal to or greater than the predetermined number of times. Therefore, the display control unit 150 changes the depth of the display object 230a in accordance with the change in the position of the object 90 with respect to the transmissive display 10, for example, when $t=t_1+1$. Thereafter, however, the display control unit 150 does not change the position when $t=t_1+2$ and $t=t_1+3$. As shown in 22-1 to 22-4 of FIG. 22, the display object 230a seems to stop from the viewpoint position 80 after the display object 230a first moves in accordance with the object 90. By allowing the number of times switching occurs between the increase and the decrease in the depth of the display object 230 to be less than the predetermined number of times, it is possible to prevent the burden on the eyes of the person who views the display object 230. That is, it is possible to reduce the burden on the eyes of the person who views the display object 230.

In FIGS. 15 to 22, the time t is simply described as $t_1$, $t_1+1$, $t_1+2$, $t_1+3$ to simply express the elapse of the time. However, the predetermined time can be expressed in various ways. For example, the predetermined time may be expressed as the number of seconds. Further, the predetermined time may represent the number of times that the acquisition unit 120 acquires the position information indicating the relative relation between the transmissive display 10 and the object 90.

The display control unit 150 may measure progress of the change in the relative position of the object 90 with respect to the transmissive display 10 in order to determine whether a constraint condition regarding a progress of the change in the depth of the display object 230 is satisfied. In this case, for example, when the acquisition unit 120 acquires the position information, the display control unit 150 measures the change (for example, a change amount and a change direction) in the relative position of the object 90 with respect to the transmissive display 10 using the current position information and the previously acquired position information. For example, the display control unit 150 calculates a change (for example, the change amount and the change direction) in the depth of the display object 230 from the measured change in the relative position of the object 90 and determines whether the change in the depth of the display object 230 satisfies the constraint condition. Further, the display control unit 150 may determine whether the constraint condition is satisfied from not progress (one change) of the change in the relative position of the object 90 measured from two pieces of position information but from progress (two or more changes) of a series of changes in the relative position of the object 90 measured from three or more pieces of position information. Further, progress of the change in the depth of the display object 230 rather than progress of the change in the relative position of the object 90 with respect to the transmissive display 10 may directly be measured.

When the relative position of the object 90 with respect to the transmissive display 10 in the position information is not changed by a distance equal to or greater than the predetermined distance per predetermined time, the display control unit 150 may not change the depth of the display object 230. For example, when the position of the object 90 is changed in the directions in which the object 90 becomes closer to and farther away from the transmissive display 10 and the distance of the changed position is less than the predetermined distance, the depth of the display object 230 is not changed from the depth shown in 21-1 of FIG. 21. That is, the depth of the display object 230 is not changed in the direction in which the object 90 becomes closer to the transmissive display 10, as shown in 21-2 to 21-4 of FIG. 21. Thus, when the position of the object 90 is not considerably changed, the depth or the display position of the display object 230 may also not to be changed. That is, it is possible to prevent the display object 230 from fluctuating unconditionally with a slight movement of the object 90. As a result, it is possible to reduce the burden on the eyes of the person who views the display object 230.

Control of Prevention of Collision with Transmissive Display

Figure 23:
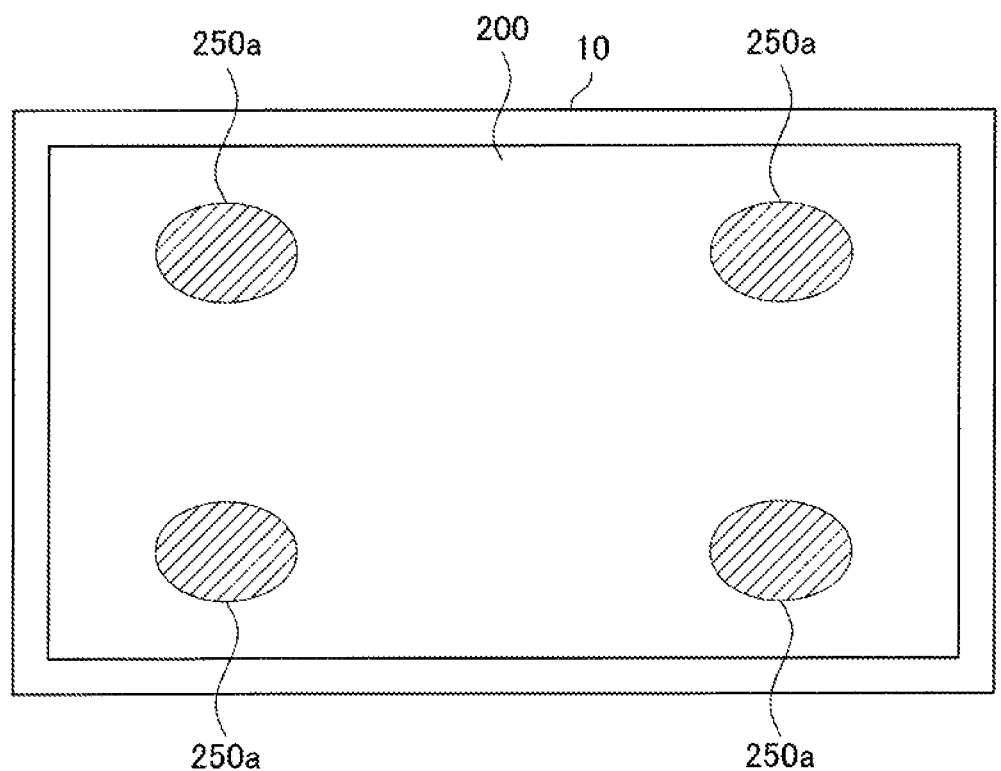
FIG. 23 is a diagram illustrating a first example of a collision prevention object.
Figure 24:
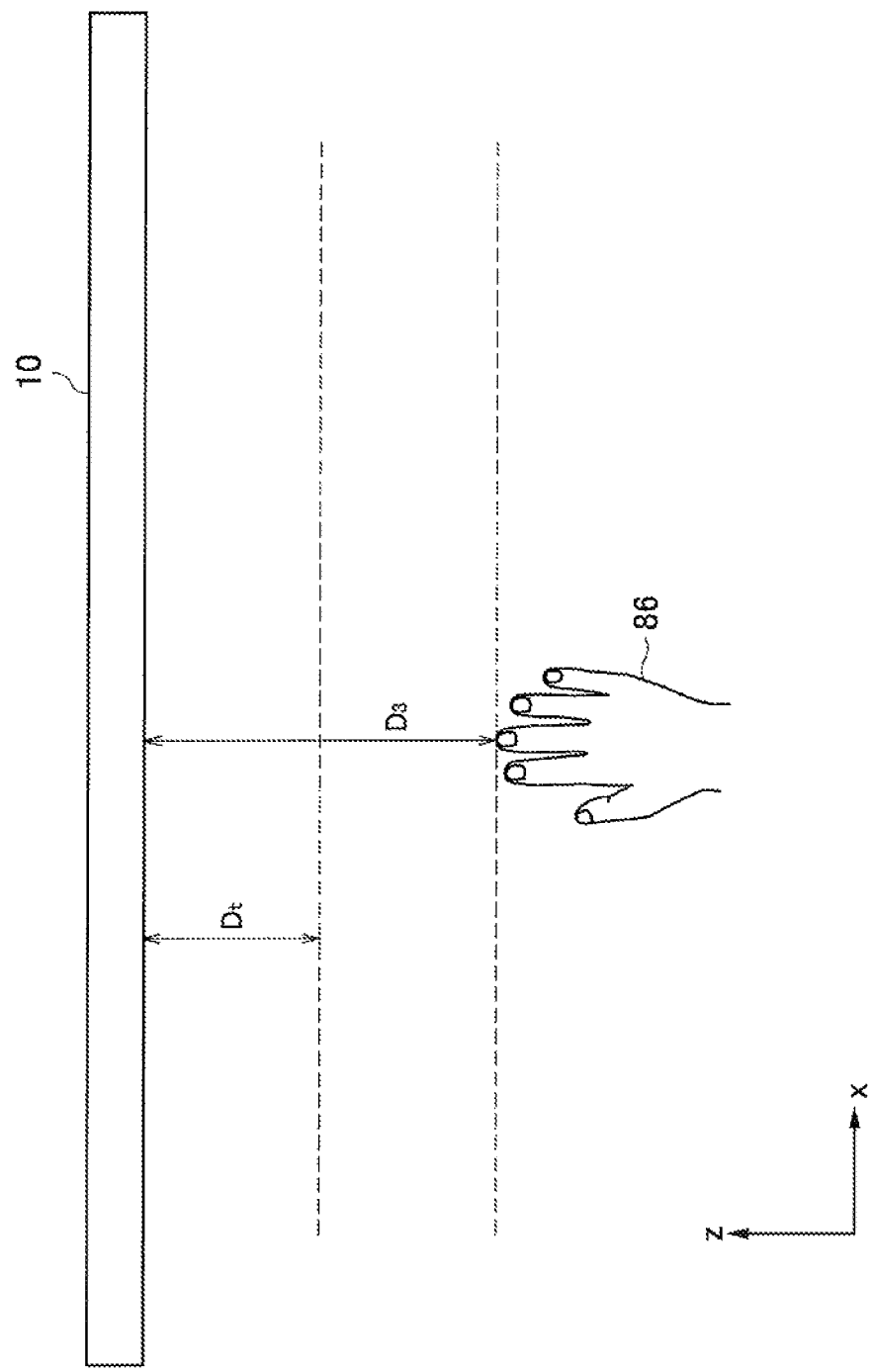
FIG. 24 is a diagram illustrating a timing example of display of the collision prevention object.
Figure 25:
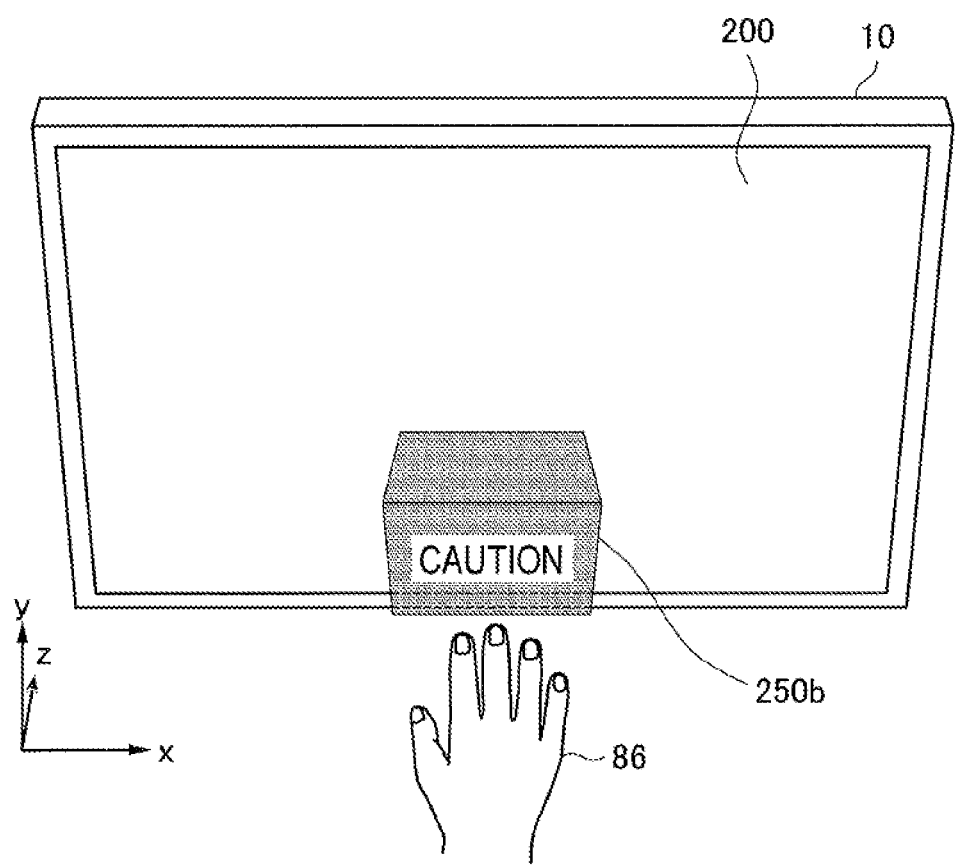
FIG. 25 is a diagram illustrating a second example of the collision prevention object.

Next, the control of the prevention of the collision with the transmissive display by the display control unit 150 will be described. The display control unit 150 may display a display object (hereinafter, referred to as a "collision prevention object") that informs the person located on the side of the second surface of the transmissive display 10 of the presence of the transmissive display 10. FIG. 23 is a diagram illustrating a first example of a collision prevention object 250. Referring to FIG. 23, for example, four circular stationary collision prevention objects 250a are displayed on the display 200 of the transmissive display 10. Further, the display control unit 150 may display the collision prevention object 250 in accordance with a touch distance which is the distance between the transmissive display 10 and the person or a part (for example, a hand) of the body of the person. FIG. 24 is a diagram illustrating a timing example of the display of the collision prevention object 250. Referring to FIG. 24, for example, the collision prevention object 250 is displayed when a touch distance $D_3$ is less than a threshold value $D_t$. FIG. 25 is a diagram illustrating a second example of the display of the collision prevention object 250. Referring to FIG. 25, for example, a collision prevention object 250b popping up dynamically so as to be perceived by the person may be displayed on the screen 200 of the transmissive display 10 when the touch distance $D_3$ is less than the threshold value $D_t$.

Thus, the display of the collision prevention object 250 can prevent a situation in which the person collides with the transmissive display 10 without noticing the presence of the transmissive display 10 when attempting to touch the object 90. Further, by displaying the collision prevention object 250 in accordance with the touch distance, no collision prevention object can be displayed when there is no danger of collision. As a result, since the display object 230 can be displayed in a broader range, it is possible to ensure that the person easily views the object 90.

Figure 26:
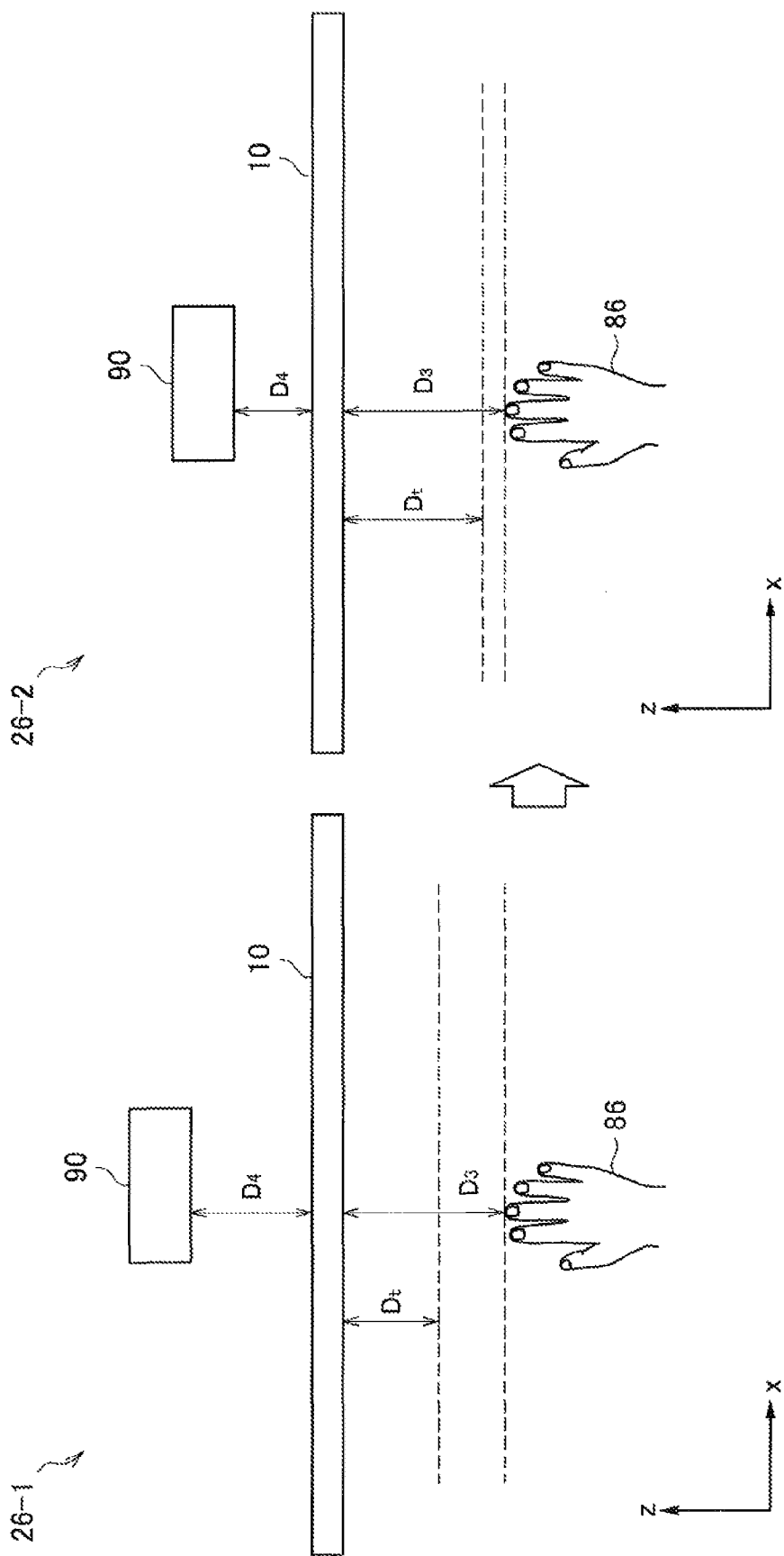
FIG. 26 is a diagram illustrating a timing example of display of a collision prevention object in accordance with the position of an object.

The display control unit 150 may display the collision prevention object 250 to the person even when the shorter the distance (hereinafter referred to as an "object disposition distance") between the positions of the transmissive display 10 and the object 90 in the position information is, the longer the touch distance is. FIG. 26 is a diagram illustrating a timing example of the display of the collision prevention object 250 in accordance with the position of the object 90. Referring to FIG. 26, the predetermined threshold value $D_t$ of the touch distance $D_3$ is larger when an object disposition distance $D_4$ is smaller, as in 26-2 of FIG. 26, than when the object disposition distance $D_4$ is larger, as in 26-1 of FIG. 26. In general, a person feels that it is easier to touch the object 90 with his or her hand when the object 90 is nearer. Accordingly, when there is a high probability that the person will touch the object 90, the display timing of the collision prevention object 250 is set in the above-described way to display the collision prevention object 250 earlier, and therefore the collision can be more likely to be prevented.

2.3. Hardware Configuration of Display Control Apparatus

Figure 27:
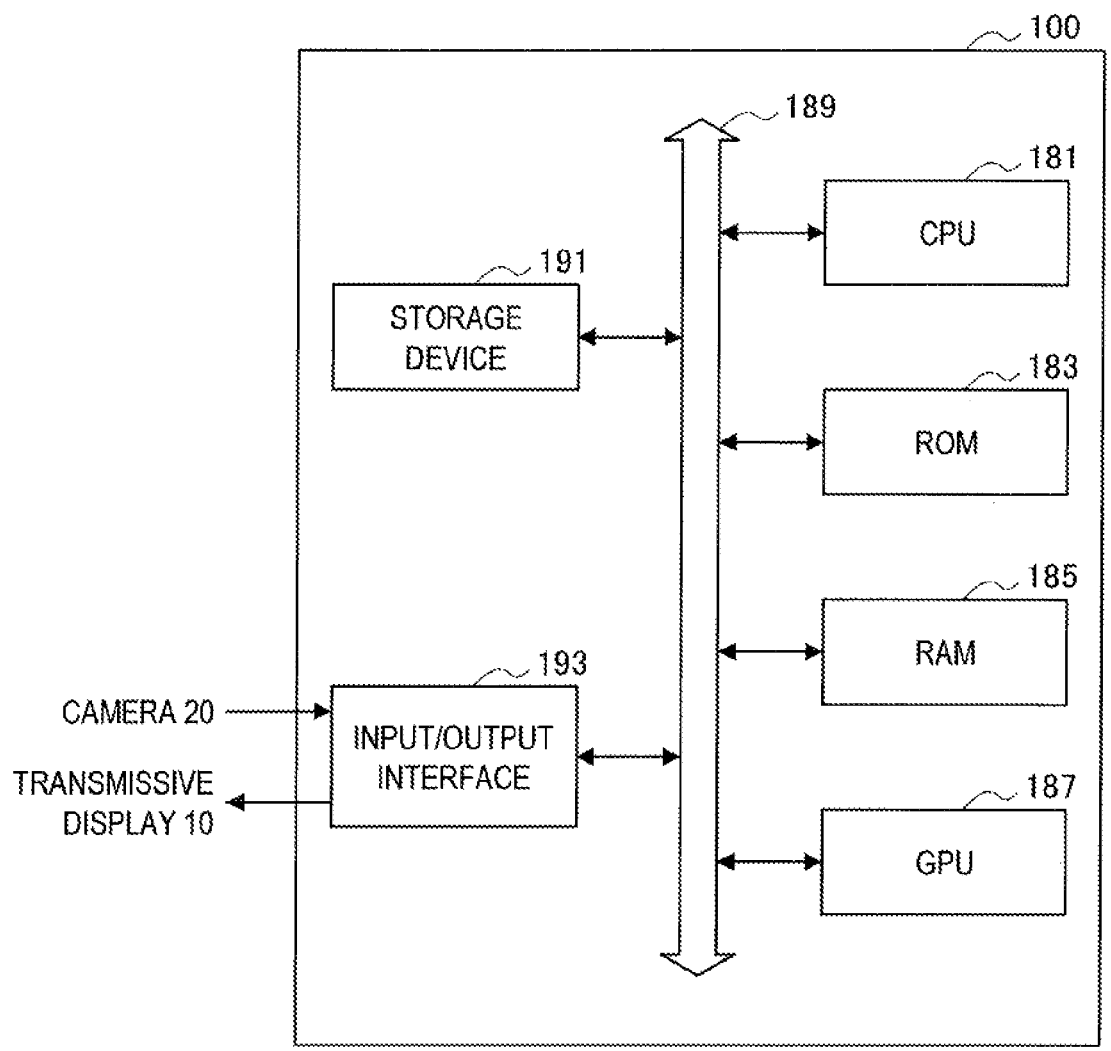
FIG. 27 is a block diagram illustrating an example of a hardware configuration of the display control apparatus according to an embodiment.

Next, an example of a hardware configuration of the display control apparatus 100 according to this embodiment will be described with reference to FIG. 27. FIG. 27 is a block diagram illustrating an example of the hardware configuration of the display control apparatus 100 according to the embodiment. Referring to FIG. 27, the display control apparatus 100 includes a central processing unit (CPU) 181, a read-only memory (ROM) 183, a random access memory (RAM) 185, a graphics processing unit (GPU) 187, a bus 189, a storage device 191, and an input/output interface 193.

The CPU 181 functions as an arithmetic processing device and a control device and controls all or some of the operations of the display control apparatus 100 in accordance with various programs stored in the ROM 183, the RAM 185, or the storage device 191. The ROM 183 stores programs, calculation parameters, or the like used by the CPU 181. The RAM 185 preliminarily stores the programs used by the CPU 181 or parameters or the like changed appropriately in execution of the programs. The GPU 187 performs various processes associated with the display of a display apparatus (for example, the transmissive display 10) first from generation (for example, generation of the right-eye and left-eye images by rendering) of a display screen. The bus 189 connects the CPU 181, the ROM 183, the RAM 185, and the GPU 187 to one another. Further, the storage device 191 and the input/output interface 193 are connected to the bus 189.

For example, the storage device 191 stores various kinds of data such as basic software such as an operation system (OS) or applications. Here, examples of the storage device 191 include a magnetic recording medium such as a hard disk and a non-volatile memory such as an electrically erasable and programmable read-only memory (EEPROM), a flash memory, a magnetoresistive random access memory (MRAM), a ferroelectric random access memory (FeRAM), or a phase change random access memory (PRAM), but the embodiment of the present disclosure is not limited to the mentioned examples.

For example, the input/output interface 193 connects the transmissive display 10, the camera 20, and the like to each other. Here, examples of the input/output interface 193 include a universal serial bus (USB) terminal, a digital visual interface (DVI) terminal, and a high-definition multimedia interface (HDMI) terminal, but the embodiment of the present disclosure is not limited to the mentioned examples.

3. Processing Flow

Hereinafter, first and second examples of a display control process according to this embodiment will be described with reference to FIGS. 28 and 29.

First Example of Display Control Process

Figure 28:
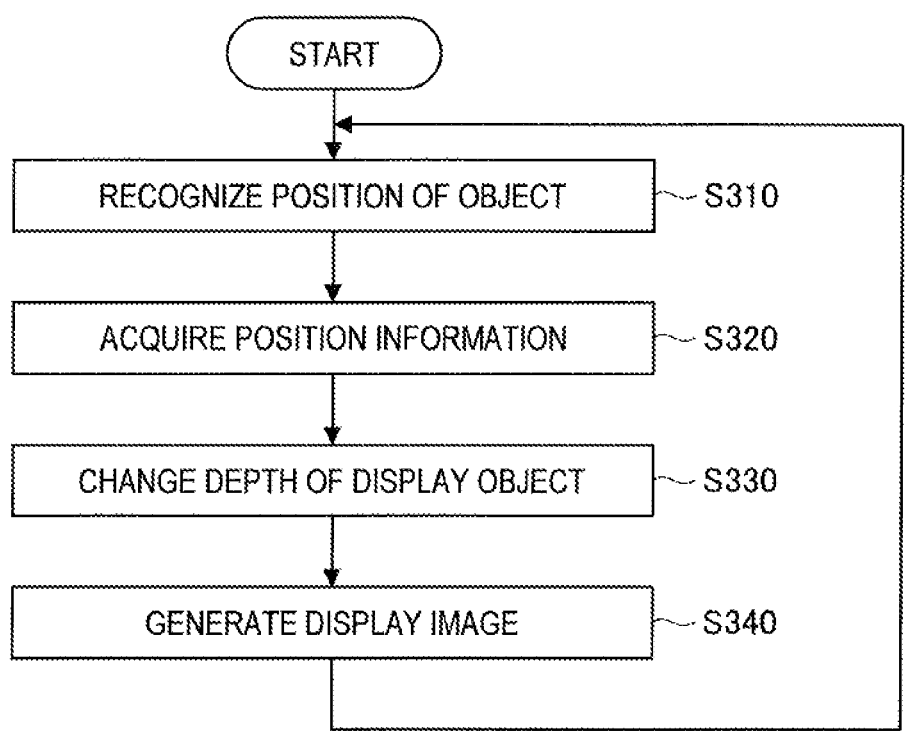
FIG. 28 is a flowchart illustrating a first example of a schematic processing flow of a display control process according to an embodiment.

FIG. 28 is a flowchart illustrating a first example of a schematic processing flow of the display control process according to this embodiment. In the first example of the display control process, the depth of the display object 230 from the screen 200, which is perceived from the viewpoint position 80, is changed in accordance with the change in the relative positional relation between the transmissive display 10 and the object 90, as described above in the basic control of the depth.

Referring to FIG. 28, in step S310, the recognition unit 110 first recognizes the relative position of the object 90 with respect to the transmissive display 10.

Next, in step S320, the acquisition unit 120 acquires the position information indicating the relative positional relation between the transmissive display 10 and the object 90.

Next, in step 330, the display control unit 150 changes the depth of the display object 230 the screen 200, which is perceived from the viewpoint position 80, from, in accordance with the change in the relative positional relation between the transmissive display 10 and the object 90 in the position information, the display object 230 being displayed to be stereoscopically viewed.

In step S340, the image generation unit 140 generates the right-eye and left-eye images including the right-eye and left-eye objects of the display object 230 of which the perceived depth is changed, respectively, as the display image.

Second Example of Display Control Process

Figure 29:
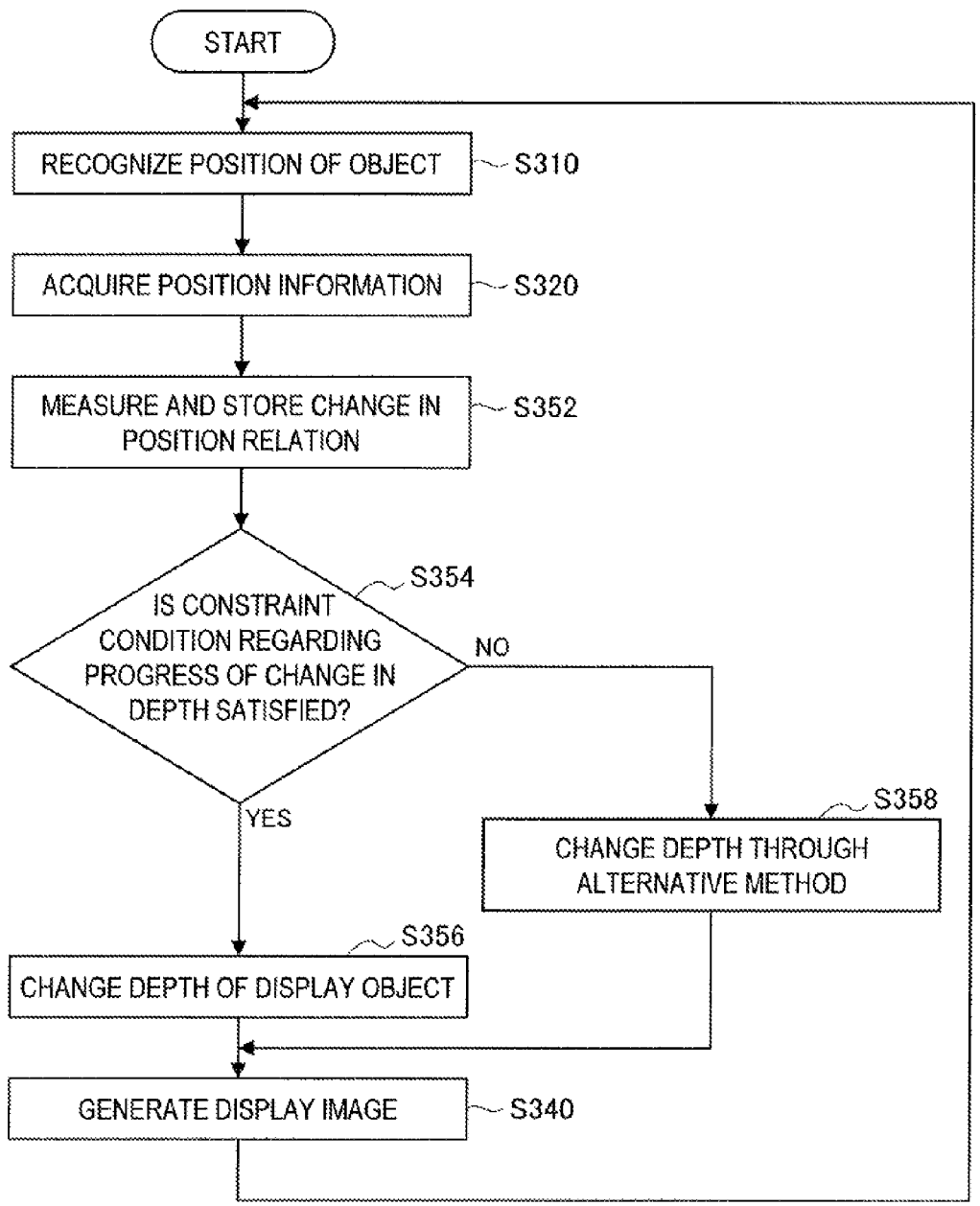
FIG. 29 is a flowchart illustrating a second example of the schematic processing flow of the display control process according to an embodiment.

FIG. 29 is a flowchart illustrating a second example of the schematic processing flow of the display control process according to this embodiment. In the second example of the display control process, as described in the control of the progress of the change in the depth, the depth of the display object 230 is changed so that the constraint condition regarding the progress of the change in the depth of the display object 230 is satisfied. Here, only step S352, step S354, step S356, and step S358 of the second example of the display control process, which are different from those of the first example of the display control process shown in FIG. 28, will be described.

In step S352, the display control unit 150 measures and stores the change in the relative position of the object 90 with respect to the transmissive display 10 using the newly acquired position information and the previously acquired position information.

In step S354, from the progress of the change in the relative position of the object 90, the display control unit 150 determines whether the constraint condition regarding the progress of the change in the depth of the display object 230 is satisfied. Here, when the constraint condition is satisfied, the process proceeds to step S356. Conversely, when the constraint condition is not satisfied, the process proceeds to step S358.

In step S356, the display control unit 150 changes the depth of the display object 230 from the screen 200, which is perceived from the viewpoint position 80, in accordance with the change in the relative positional relation between the transmissive display 10 and the object 90 in the position information, the display object 230 being displayed to be stereoscopically viewed.

In step S358, the display control unit 150 changes the depth of the display object 230 through an alternative method. For example, the display control unit 150 changes the depth of the display object 230 by a small change amount, as described with, reference to FIG. 17, or maintains the depth of the display object 230, as described with reference to FIG. 21.

4. Modified Examples

The transmissive display 10 serving as a multiple-viewpoint stereoscopic display and a case in which stereoscopic display is realized at multiple viewpoints will be described as modified examples of the above-described embodiment. In the modified examples, a plurality of viewpoint positions 80 are set and the depth of the display object 230 from the screen 200, which is perceived from each viewpoint position among the plurality of viewpoint positions 80, is changed in accordance with the change in the positional relation between the transmissive display 10 and the object 90.

4.1. Logical Configuration of Display Control Apparatus

A display control apparatus 100 according to a modified example includes a recognition unit 110, an acquisition unit 120, a storage unit 130, an image generation unit 140, and a display control unit 150, as in the embodiment described with reference to FIG. 7. Here, the recognition unit 110 and the acquisition unit 120 according to this modified example are not different from those of the above-described embodiment. Thus, differences between the storage unit 130, the image generation unit 140, and the display control unit 150 according to the above-described embodiment and those according to this modified example will be described below.

Storage Unit 130

When storing the display position or the display attribute of the display object 230 for the stereoscopic view, the storage unit 130 stores the display position or the display attribute of the display object 230 for the stereoscopic view corresponding to each viewpoint position among the plurality of viewpoint positions 80. For example, as shown in FIG. 4, the storage unit 130 may store the display position or the display attribute of the display object 230 for the stereoscopic view corresponding to the viewpoint position which is a combination of the individual positions $E_3$ and $E_4$. Further, the storage unit 130 may store the display positions or the display attributes of the display object 230 for the stereoscopic view corresponding to a viewpoint position that is a combination of the individual positions $E_1$ and $E_2$, a viewpoint position that is a combination of the individual positions $E_5$ and $E_6$, and a viewpoint position that is a combination of the individual positions $E_7$ and $E_8$.

Image Generation Unit 140

When generating the display image, the image generation unit 140 generates images to be displayed at the individual display regions (for example, 206-1 to 206-8 in FIG. 4) corresponding to the individual positions (for example, the individual positions $E_1$ to $E_8$). For example, the image generation unit 140 generates the images to be displayed at the individual display regions based on the display position and the display attribute of the display object 230 corresponding to each viewpoint position stored in the storage unit 130. For example, the image generation unit 140 generates the images to be displayed at the display regions 206-3 and 206-4 based on the display position or the display attribute of the display object 230 for the stereoscopic view stored for the viewpoint position that is the combination of the individual positions E3 and E4.

Display Control unit 150

Figure 30:
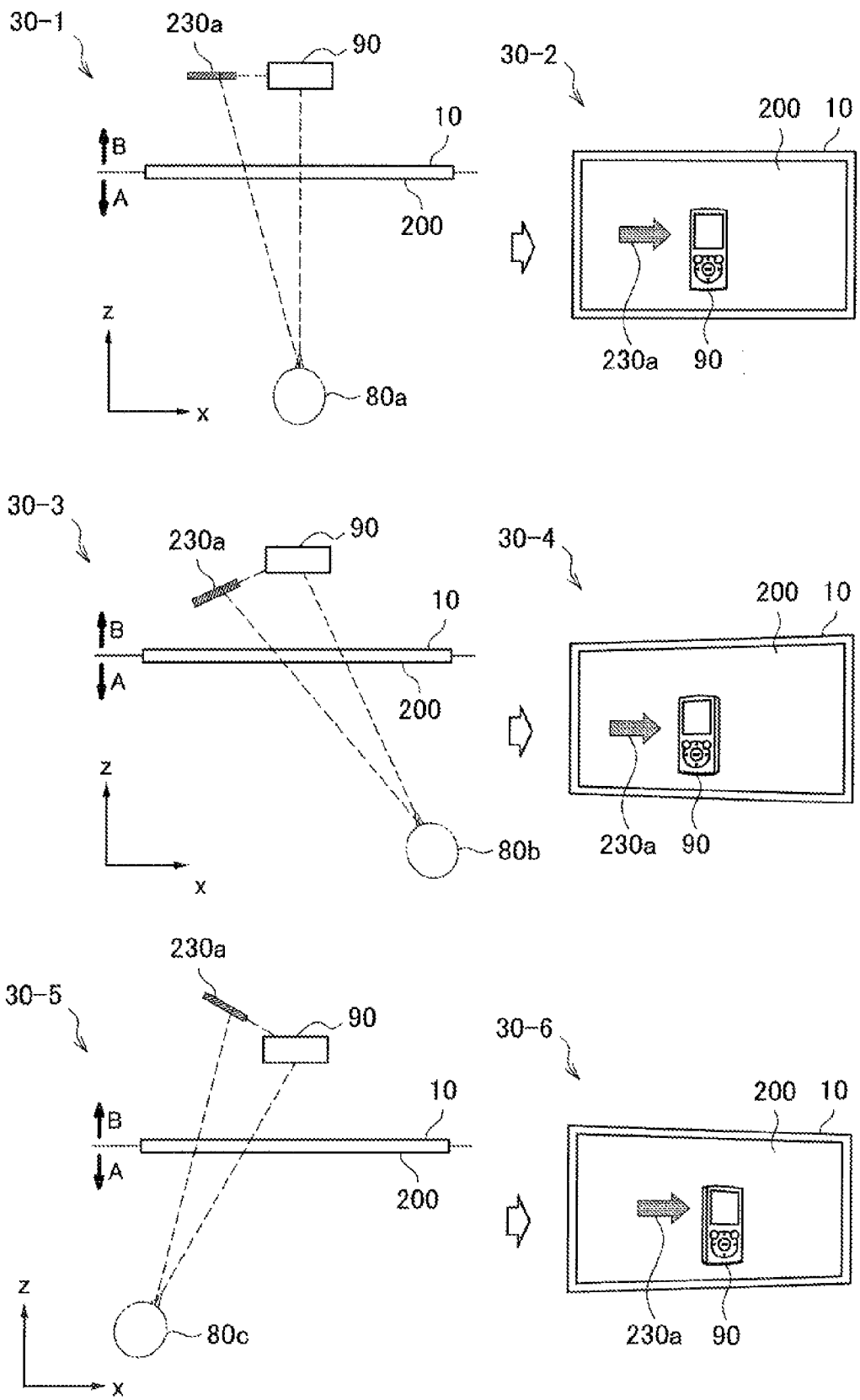
FIG. 30 is a diagram illustrating an example of the display of a display object in stereoscopic view display at multiple viewpoints.

The display control unit 150 changes the depth of the display object 230 from the screen 200, which is perceived from each viewpoint position, in accordance with the positional relation between the transmissive display 10 and the object 90, the display object 230 being displayed to be stereoscopically viewed by the transmissive display 10. For example, the display control unit 150 changes the depth of the display object 230 from the screen 200 at each viewpoint position. FIG. 30 is a diagram illustrating an example of the display of the display object 230 in the stereoscopic view display with respect to the multiple viewpoints. As shown in 30-1, 30-3, and 30-5 of FIG. 30, viewpoint positions 80a, 80b, and 80c are set. As described above, the display positions of the display object 230 for the stereoscopic view are stored with respect to the viewpoint positions 80a, 80b, and 80c in the storage unit 230. For example, here, the display position of the display object 230a for the stereoscopic view is changed and stored so that the display object 230e is displayed from any position of the viewpoint positions 80a to 80c, as the display object 230a indicates the object 90 from the left. Therefore, as in 30-1 of FIG. 30, the display position of the display object 230a for the stereoscopic view with respect to the viewpoint position 80a is a position slightly deviated from the object 90 in the x-axis direction. Further, as in 30-3 and 30-5 of FIG. 30, the display positions of the display object 230a for the stereoscopic view with respect to the viewpoint positions 80b and 80c are positions of the display object 230 slightly deviated from the object 90 in the x-axis direction and the z-axis direction. As shown in 30-2, 30-4, and 30-6 of FIG. 30, the display object 230 seems to indicate the object 90 from the left from each viewpoint position.

By changing the display positions (including the depth) of the display object 230 with respect to the plurality of viewpoint positions, the position (including the depth) of the display object 230 with respect to each viewpoint position can be made to be perceived. Accordingly, even when the viewpoint position is changed, a relation between the perceived depth of the object 90 and the depth of the display object 230 can be maintained. For example, as described above, the position (including the depth) of the display object 230 can be made to be perceived just as if the display object 230 were present at the left position of the object 90 from any viewpoint position of the plurality of viewpoint positions. Accordingly, since it is easier for a person to view the object 90 and the display object 230 together, it is possible to reduce the burden on the eyes of the person.

4.2. Processing Flow

Figure 31:
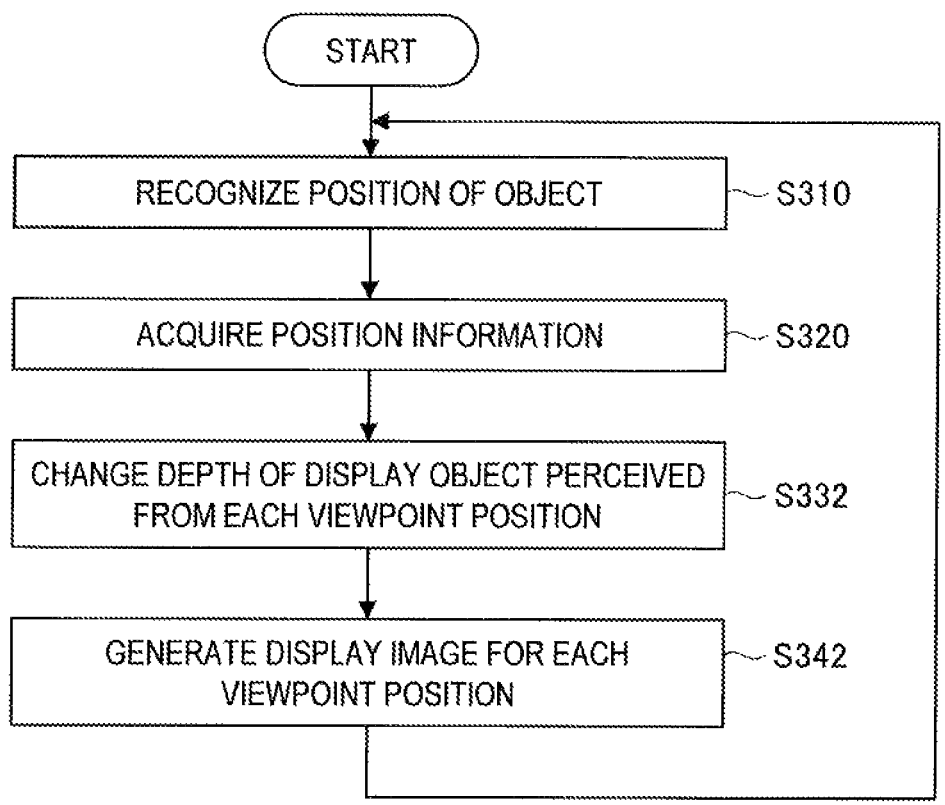
FIG. 31 is a flowchart illustrating an example of a schematic processing flow of a display control process according to a modified example of the embodiment.

FIG. 31 is a flowchart illustrating an example of a schematic processing flow of a display control process according to a modified example of this embodiment. Hereinafter, in an example of the display control process according to a modified example, only step S332 and step S342, which are different from those of the first example of the display control process described above in FIG. 28 in the embodiment, will be described.

In step S332, the display control unit 150 changes the depth of the display object from the screen 200, which is perceived from each viewpoint position, in accordance with the change in the positional relation between the transmissive display 10 and the object 90, the display object 230 being displayed to be stereoscopically viewed by the transmissive display 10.

In step S342, the image generation unit 140 generates an image display to be displayed at the individual display region corresponding to each individual position. Then, the display image for each viewpoint position that is a combination of two individual positions is generated.

5. Summarization

The display control system 1 and the display control apparatus 100 according the embodiment of the present disclosure have been described above with reference to FIGS. 1 to 31. According to this embodiment, the display of the transmissive display 10 can be realized so as to reduce the burden on the eyes of the person when the person views the object 90 through the transmissive display 10.

According to this embodiment, for example, the position of the display object 230 other than the depth of the display object 230 perceived from the viewpoint position 80 is also changed. Thus, the person can view the object 90 and the display object 230 together without considerable movement of his or her eyes in the depth direction and in the right and left directions. As a result, since it is easier for the person to view the object 90 and the display object 230, it is possible to reduce the burden on the eyes of the person.

According to this embodiment, for example, the depth of the display object 230 is changed so that the constraint condition regarding the progress of the change in the depth of the display object 230 is satisfied. Thus, the change in the depth of the display object 230 causing the burden on the eyes of the person can be avoided. As a result, it is possible to reduce the burden on the eyes of the person who views the display object 230.

According to this embodiment, for example, the collision prevention object 250 is displayed on the transmissive display 10. Thus, it is possible to prevent the situation in which the person collides with the transmissive display 10 without noticing the presence of the transmissive display 10 when attempting to touch the object 90.

According to this embodiment, for example, the display position (including the depth) of the display object 230 with respect to the plurality of viewpoint positions is changed in the stereoscopic display at the plurality of viewpoint positions. Thus, the position (including the depth) of the display object 230 can be perceived in accordance with each viewpoint position. Accordingly, since it is easier for the person to view the object 90 and the display object 230, it is possible to reduce the burden on the eyes of the person.

The preferred embodiments of the present disclosure have been described above in detail with reference to the accompanying drawings, but the technical scope of the present disclosure is not limited thereto. It is apparent to those skilled in the technical fields of the present disclosure that the embodiments of the present disclosure are modified or corrected in various ways within the technical spirit and essence described in claims, and the modifications and the corrections are, of course, understood to pertain to the technical scope of the present disclosure.

In the above-described embodiment, for example, the display control apparatus including the recognition unit and the image generation unit has been described, but the present disclosure is not limited thereto. For example, the display control apparatus may not include the recognition unit and the image generation unit and another apparatus directly or indirectly connected to the display control apparatus may include the recognition unit and the image generation unit.

Additionally, the present technology may also be configured as below.

(1) A display control apparatus controlling display of a transmissive display which includes a screen configured to transmit light arriving from an object located on a side of a first surface so that the object is viewable from a viewpoint position set on a side of a second surface which is an opposite surface to the first surface and which displays a display object to be stereoscopically viewed, comprising:

an acquisition unit that acquires position information indicating a relative positional relation between the transmissive display and the object; and a display control unit that changes, in accordance with a change in the relative positional relation in the position information, a depth of the display object from the screen perceived from the viewpoint position, the display object being displayed to be stereoscopically viewed by the transmissive display.

(2) The display control apparatus according to (1), wherein the transmissive display displays the display object to be stereoscopically viewed by displaying right-eye and left-eye images including right-eye and left-eye objects of the display object, respectively, on the screen, and the display control unit changes the depth by changing an offset in right and left directions between a display position of the right-eye object and a display position of the left-eye object within the screen.

(3) The display control apparatus according to (1), wherein the display control unit does not change the depth when a relative position of the object with respect to the transmissive display in the position information is not changed by a predetermined distance or more per predetermined time.

(4) The display control apparatus according to any one of (1) to (3), wherein the display control unit changes the depth so that a constraint condition regarding progress of a change in the depth of the display object is satisfied.

(5) The display control apparatus according to (4), wherein the display control unit changes the depth so that a change amount of the depth per predetermined time is less than a predetermined change amount.

(6) The display control apparatus according to (4) or (5), wherein the display control unit changes the depth so that the number of times switching occurs between an increase and a decrease in the depth per predetermined time is less than a predetermined number of times.

(7) The display control apparatus according to any one of (1) to (6), wherein the transmissive display is a multiple-viewpoint stereoscopic display that displays an individual display image corresponding to each viewpoint position among a plurality of viewpoint positions set on the side of the second surface so as to be perceived from each viewpoint position and displays the display object to be stereoscopically viewed in the individual display image, and the display control unit changes, in accordance with the change in the relative positional relation, the depth of the display object from the screen perceived from each viewpoint position, the display object being displayed to be stereoscopically viewed by the transmissive display.

(8) The display control apparatus according to any one of (1) to (7), wherein the acquisition unit acquires expanded position information indicating a relative positional relation between the transmissive display, the object and a person located on the side of the second surface of the transmissive display, and the display control unit changes, in accordance with a change in the relative positional relation in the expanded position information, the depth of the display object from the screen perceived from a position of the person.

(9) The display control apparatus according to any one of (1) to (8), Wherein the display control unit further changes the position of the display object other than the depth in accordance with the position information, the position of the display object being perceived from the viewpoint position.

(10) The display control apparatus according to any one of (1) to (9), wherein the display control unit causes a display object to be displayed to make a person located on the side of the second surface aware of the presence of the transmissive display.

(11) The display control apparatus according to (10), wherein the acquisition unit additionally acquires a first distance between the transmissive display and the person or a part of a body of the person, and the display control unit causes the display object to be displayed to make the person aware of the presence of the transmissive display in accordance with the first distance.

(12) The display control apparatus according to (11), wherein the display control unit causes the display object to be displayed to make the person aware of the presence of the transmissive display, even when the longer the first distance is, the shorter a second distance between a position of the transmissive display and a position of the object in the position information is.

(13) The display control apparatus according to any one of (1) to (12), further comprising:

a recognition unit that recognizes a relative position of the object with respect to the transmissive display, wherein the acquisition unit acquires the position information from the recognition unit.

(14) A display control method of controlling display of a transmissive display which includes a screen configured to transmit light arriving from an object located on a side of a first surface so that the object is viewable from a viewpoint position set on a side of a second surface which is an opposite surface to the first surface and which displays a display object to be stereoscopically viewed, comprising:

acquiring position information indicating a relative positional relation between the transmissive display and the object; and changing, in accordance with a change in the relative positional relation in the position information, a depth of the display object from the screen perceived from the viewpoint position, the display object being displayed to be stereoscopically viewed by the transmissive display.

(15) A computer program for causing a computer, which is directly or indirectly connected to a transmissive display which includes a screen configured to transmit light arriving from an object located on a side of a first surface so that the object is viewable from a viewpoint position set on a side of a second surface which is an opposite surface to the first surface and which displays a display object to be stereoscopically viewed, to execute:

acquiring position information indicating a relative positional relation between the transmissive display and the object; and changing, in accordance with a change in the relative positional relation in the position information, a depth of the display object from the screen perceived from the viewpoint position, the display object being displayed to be stereoscopically viewed by the transmissive display.

What is claimed is:

1. A display control apparatus controlling display of a transmissive display which includes a screen configured to transmit light arriving from an object located on a side of a first surface so that the object is viewable from a viewpoint position set on a side of a second surface which is an opposite surface to the first surface and which displays a display object to be stereoscopically viewed, comprising:

a processing device that:

acquires position information indicating a relative positional relation between the transmissive display and the object; and changes, in accordance with a change in the relative positional relation in the position information, a depth of the display object from the screen perceived from the viewpoint position, the display object being displayed to be stereoscopically viewed by the transmissive display, In which the depth is changed based on a determination whether the number of times switching occurs per predetermined time, in which the switching is between an increase and a decrease in the depth, is less than a predetermined number of times, and when a result of the determination is the number of times the switching occurs per the predetermined time is not less than the predetermined number of times, the depth is changed to a depth of the display object corresponding to the relative positional relation in the position information at a time of a first switching in the depth during the predetermined time.

2. The display control apparatus according to claim 1, wherein the transmissive display displays the display object to be stereoscopically viewed by displaying right-eye and left-eye images including right-eye and left-eye objects of the display object, respectively, on the screen, and the processing device changes the depth by changing an offset in right and left directions between a display position of the right-eye object and a display position of the left-eye object within the screen.

3. The display control apparatus according to claim 1, wherein the processing device does not change the depth when a relative position of the object with respect to the transmissive display in the position information is not changed by a predetermined distance or more per predetermined time.

4. The display control apparatus according to claim 1, wherein the processing device changes the depth so that a constraint condition regarding progress of a change in the depth of the display object is satisfied.

5. The display control apparatus according to claim 4, wherein the processing device changes the depth so that a change amount of the depth per predetermined time is less than a predetermined change amount.

6. The display control apparatus according to claim 1, wherein the transmissive display is a multiple-viewpoint stereoscopic display that displays an individual display image corresponding to each viewpoint position among a plurality of viewpoint positions set on the side of the second surface so as to be perceived from each viewpoint position and displays the display object to be stereoscopically viewed in the individual display image, and the processing device changes, in accordance with the change in the relative positional relation, the depth of the display object from the screen perceived from each viewpoint position, the display object being displayed to be stereoscopically viewed by the transmissive display.

7. The display control apparatus according to claim 1, wherein processing device acquires expanded position information indicating a relative positional relation between the transmissive display, the object and a person located on the side of the second surface of the transmissive display, and changes, in accordance with a change in the relative positional relation in the expanded position information, the depth of the display object from the screen perceived from a position of the person.

8. The display control apparatus according to claim 1, wherein the processing device changes the position of the display object other than the depth in accordance with the position information, the position of the display object being perceived from the viewpoint position.

9. The display control apparatus according to claim 1, wherein the processing device causes a display object to be displayed to make a person located on the side of the second surface aware of the presence of the transmissive display.

10. The display control apparatus according to claim 9, wherein processing device acquires a first distance between the transmissive display and the person or a part of a body of the person, and causes the display object to be displayed to make the person aware of the presence of the transmissive display in accordance with the first distance.

11. The display control apparatus according to claim 10, wherein the processing device causes the display object to be displayed to make the person aware of the presence of the transmissive display, even when the longer the first distance is, the shorter a second distance between a position of the transmissive display and a position of the object in the position information is.

12. The display control apparatus according to claim 1, wherein the processing device recognizes a relative position of the object with respect to the transmissive display, and acquires the position information based on recognizing of the relative position.

13. The display control apparatus according to claim 1, wherein, when the result of the determination is the number of times the switching occurs per the predetermined time is not less than the predetermined number of times, the depth is maintained at the depth of the display object corresponding to the relative positional relation in the position information at the time of the first switching in the depth, from the time of the first switching in the depth until an end of the predetermined time.

14. A display control method of controlling display of a transmissive display which includes a screen configured to transmit light arriving from an object located on a side of a first surface so that the object is viewable from a viewpoint position set on a side of a second surface which is an opposite surface to the first surface and which displays a display object to be stereoscopically viewed, comprising:

acquiring position information indicating a relative positional relation between the transmissive display and the object; and changing, in accordance with a change in the relative positional relation in the position information, a depth of the display object from the screen perceived from the viewpoint position, the display object being displayed to be stereoscopically viewed by the transmissive display, in which the depth is changed based on a determination whether the number of times switching occurs per predetermined time, in which the switching is between an increase and a decrease in the depth, is less than a predetermined number of times, and when a result of the determination is the number of times the switching occurs per the predetermined time is not less than the predetermined number of times, the depth is changed to a depth of the display object corresponding to the relative positional relation in the position information at a time of a first switching in the depth during the predetermined time.

15. A non-transitory computer readable medium containing a computer program for causing a computer, which is directly or indirectly connected to a transmissive display which includes a screen configured to transmit light arriving from an object located on a side of a first surface so that the object is viewable from a viewpoint position set on a side of a second surface which is an opposite surface to the first surface and which displays a display object to be stereoscopically viewed, to execute:

- acquiring position information indicating a relative positional relation between the transmissive display and the object; and
- changing, in accordance with a change in the relative positional relation in the position information, a depth of the display object from the screen perceived from the viewpoint position, the display object being displayed to be stereoscopically viewed by the transmissive display,
- in which the depth is changed based on a determination whether the number of times switching occurs per predetermined time, in which the switching is between an increase and a decrease in the depth, is less than a predetermined number of times, and
- when a result of the determination is the number of times the switching occurs per the predetermined time is not less than the predetermined number of times, the depth is changed to a depth of the display object corresponding to the relative positional relation in the position information at a time of first switching in the depth during the predetermined time.

* * * * *